US012510088B1

(12) United States Patent
Yang

(10) Patent No.: US 12,510,088 B1
(45) Date of Patent: Dec. 30, 2025

(54) WAIST FAN

(71) Applicant: SHENZHEN SHIWU TECHNOLOGY CO., LTD, Guangdong (CN)

(72) Inventor: Xiangyu Yang, Guangdong (CN)

(73) Assignee: SHENZHEN SHIWU TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 19/205,073

(22) Filed: May 12, 2025

(30) Foreign Application Priority Data

Apr. 28, 2025 (CN) .......................... 202520832511.3
Apr. 28, 2025 (CN) .......................... 202520835156.5
Apr. 28, 2025 (CN) .......................... 202520839776.6

(51) Int. Cl.
*F04D 25/08* (2006.01)
*F04D 25/06* (2006.01)
*F21V 9/40* (2018.01)
*F21V 33/00* (2006.01)

(52) U.S. Cl.
CPC ......... *F04D 25/08* (2013.01); *F04D 25/0673* (2013.01); *F21V 9/40* (2018.02); *F21V 33/0096* (2013.01)

(58) Field of Classification Search
None
See application file for complete search history.

(56) References Cited

U.S. PATENT DOCUMENTS

| 12,264,689 | B1 | 4/2025 | Zhu |
| 2014/0093404 | A1 | 4/2014 | Long |
| 2020/0309152 | A1 | 10/2020 | Sanford |
| 2025/0067278 | A1 | 2/2025 | Chen |

FOREIGN PATENT DOCUMENTS

| CN | 207777231 U | 8/2018 |
| CN | 214698428 U | 11/2021 |
| CN | 219327657 U | 7/2023 |

OTHER PUBLICATIONS

Amazon.com RAOUOEN 20000mAh Portable Waist Fan (Date First Available Jan. 10, 2025; URL: see claim rejections under 35 USC 102) (Year: 2025).*
Amazon.com Socool Portable Waist Fan (Date First Available Jan. 6, 2025; URL: see claim rejections under 35 USC 103) (Year: 2025).*
Amazon.com Mylyis Portable Waist Fan (Date First Available Apr. 15, 2025; URL: https://www.amazon.com/Mylyis-Portable-Wearable-Detachable-Flashlight/dp/BOF4X2HH3F?ref_=ast_sto_dp&th=1)(Year: 2025).*

* cited by examiner

*Primary Examiner* — Juan G Flores
(74) *Attorney, Agent, or Firm* — HOWARD M COHN and Associates, LLC

(57) ABSTRACT

A waist fan includes a housing, a fan assembly arranged in the accommodating cavity and configured to guide airflow from the air inlet to the air outlet, a light-emitting assembly, and a control assembly electrically connected to the light-emitting assembly and configured to control the light-emitting assembly to emit flashing light in different colors and/or warning flashing light. The housing includes an accommodating cavity, an air inlet communicated with the accommodating cavity, and an air outlet communicated with the accommodating cavity.

18 Claims, 15 Drawing Sheets

WAIST FAN

CROSS-REFERENCE TO RELATED APPLICATIONS

The application claims priorities of Chinese Patent Application No. CN202520839776.6, filed on Apr. 28, 2025, Chinese Patent Application No. CN202520835156.5, filed on Apr. 28, 2025, and Chinese Patent Application No.CN202520832511.3, filed on Apr. 28, 2025, the entire contents of which are incorporated herein by reference.

FIELD

The present disclosure relates to fans, and in particular, to a waist fan.

BACKGROUND

In recent years, people have increasingly pursued a more convenient lifestyle. To meet demand for practical fans in outdoor activities or other daily scenarios, various types of portable fans have emerged in the market, such as handheld fans and neck fans. Handheld fans require users to hold them, which can be inconvenient during activities like commuting on subways or making phone calls. Neck fans address this limitation by freeing users' hands, but they may cause discomfort in the cervical spine for individuals with neck issues. The emergence of waist fans seems to comprehensively resolve these challenges. However, currently available waist fans on the market generally lack advanced features and fail to meet consumers' personalized demands, resulting in poor sales performance.

SUMMARY

In order to solve shortcomings in existing technologies, the present disclosure is to provide a waist fan, which can improve user experience.

A waist fan provided by the present disclosure includes a housing, a fan assembly arranged in the accommodating cavity and configured to guide airflow from the air inlet to the air outlet, a light-emitting assembly, and a control assembly electrically connected to the light-emitting assembly and configured to control the light-emitting assembly to emit flashing light in different colors and/or warning flashing light. The housing includes an accommodating cavity, an air inlet communicated with the accommodating cavity, and an air outlet communicated with the accommodating cavity.

Comparing with existing technologies, in the waist fan provided by the embodiments of the present disclosure, the light-emitting assembly enables users to control the waist fan to emit flashing light of different colors and/or warning flashing light in different usage scenarios, making the application range of the waist fan more extensive, while meeting the personalized usage requirements of users, enhancing user experience and improving market competitiveness.

In one embodiment, the "dazzling light in different colors" include first-color light, second-color light, and/or Marquee-style light (color-changing flashing light). The first-color light and the second-color light are in different single colors. The Marquee-style light includes flashing light continuously alternating colors according to present programs or data. It can be understood that when being used the waist fan can be controlled to emit flashing light in a first color or to emit flashing light in a second color or to emit flashing light alternately switching between the first color and the second color, which can enhance the waist fan's entertainment value and personalized features to meet diverse consumer demands.

In one embodiment, the light-emitting assembly includes at least one first light-emitting element arranged in the accommodating cavity. The housing includes a light-transmitting region corresponding to the at least one first light-emitting element. Light emitted by the at least one first light-emitting element passes through the light-transmitting region to an outside of the housing to form the flashing light in different colors.

In one embodiment, the at least one light-emitting element includes a light source assembly configured to emit light in multiple colors. The light source assembly includes at least two sub-light sources configured to be controlled individually to emit light in two different colors respectively. Each sub-light source is configured to emit light in a specific light, thus enabling the light source assembly to emit light in multiple colors. The number of the at least one first light-emitting element is multiple, and each first light-emitting element includes a light source assembly capable of emitting light in multiple colors. Multiple first light-emitting elements are arranged in a predetermined direction. By configuring each first light-emitting element to correspond to one light source assembly, and each light source assembly including multiple sub-light sources that can be individually controlled, and with multiple first light-emitting elements in place, fault tolerance of the light-emitting assembly is significantly enhanced. If one of the first light-emitting elements fails, it does not affect operation of other first light-emitting elements, which can ensure that overall functionality of the light-emitting assembly remains working normally, thus improving the service life of the waist fan and improving user experience.

In one embodiment, the housing includes a main housing with an opening. The light-transmitting region is located in the opening. The light-transmitting region includes a lamp cover installed in the opening. The lamp cover is a translucent casing and includes a cover body portion positioned in the opening and a mounting portion connected to a side of the cover body portion that is adjacent to the at least one first light-emitting element. The light-emitting assembly further includes a light-emitting element circuit board and the at least one first light-emitting element is arranged on a surface of the light-emitting element circuit board adjacent to the lamp cover. The mounting portion is connected to the light-emitting element circuit board. A stepped portion is formed by the mounting portion and the cover body portion. The main housing is secured to the stepped portion, thereby fixing the cover body portion in the opening, with the mounting portion in contact with an inner surface of the main housing. One of the mounting portion and the light-emitting element circuit board includes a first fixing portion, the other of the mounting portion and the light-emitting element circuit board includes a second fixing portion. The first fixing portion is securely connected to the second fixing portion, thus fixing the mounting portion to the light-emitting element circuit board. By incorporating the cover body portion of the lamp cover is clamped into the opening of the main housing, in this way, the cover body portion is fixed in the opening. The main housing is clamped to the stepped portion formed by the mounting portion and the cover body portion, ensuring the stable fixation of the lamp cover onto the main housing. Meanwhile, the mounting portion and the light-emitting element circuit board are fixed together via the first fixing portion and the second fixing portion, resulting in a simple, compact, and stable and secure installation of the entire light-emitting assembly.

In one embodiment, the light-emitting assembly further includes a second light-emitting element configured to emit warning flashing light in a first lighting mode and to emit an illumination light in a second lighting mode. The warning flashing light is white flashing light, while the illumination light is white illumination light. The at least one first light-emitting element is positioned on a first side of the housing, whereas the second light-emitting element is located on a second side of the housing, opposite to the first side. By incorporating the second light-emitting element and configuring the first and second lighting modes, the waist fan can achieve both illumination and warning functions, thus enhancing the waist fan's practicality.

In one embodiment, the control assembly includes a first control button and a main circuit board. The first control button is arranged on the housing and is electrically connected to the main circuit board. The main circuit board is electrically connected to the light-emitting assembly. The first control button is configured to be operated by the user to control illumination of the light-emitting elements. When the first control button is applied on a first operation, it generates a first control signal. Based on the first control signal, the main circuit board controls switching on, switching off, or a light color of the at least one first light-emitting element. When the first control button is applied on a second operation, it generates a second control signal, based on which the main circuit board controls switching on, switching off, or lighting modes of the of the second light-emitting element. One of the first and second operations is a short press with a first operation duration, while the other is a long press with a second operation duration, where the second operation duration is longer than the first operation duration. By incorporating the first control button and using long and short presses to control the activation, deactivation, lighting states, and modes of the first and second light-emitting elements and, the operation is simple, quick, and provides a better user experience.

In one embodiment, the control assembly further includes a second control button arranged on the housing. The second control button is electrically connected to the main circuit board and configured to be operated by the user to control activation, deactivation, or a rotational speed of the fan assembly. The first control button includes a first trigger portion positioned on the main circuit board, while the second control button includes a second trigger portion located on the main circuit board. The first control button and the second control button share a same operation keypad. The housing defines a button hole, through which the operation keypad is installed. A first end of the operation keypad corresponds to the first trigger portion, and a second end of the operation keypad corresponds to the second trigger portion. When the first end is operated, the first trigger portion is activated, generating the first control signal. Similarly, when the second end is operated, the second trigger portion is triggered, generating a second control signal. Configurations of the first control button and the second control button enhances convenience and simplicity of operating the waist fan. Moreover, the operation keypad is shared between the first control button and the second control button, which contributes to a simpler, more compact structure of the waist fan, facilitating user operation and enhancing the overall user experience.

In one embodiment, the housing consists of a top plate, a bottom plate, and a side panel structure connected between the top plate and the bottom plate. Both the first control button and the second control button are positioned on the side panel structure. The main circuit board is adjacent to the side panel structure and extends from the bottom plate to the top plate. The second light-emitting element is further arranged on the side panel structure. The waist fan further includes a port assembly, which is exposed through an aperture on the housing to facilitate a connection with other electronic devices via an external data cable. The port assembly, the second light-emitting element, the first control button, and the second control button are all located on the same side of the side panel structure, arranged in order from the bottom plate to the top plate. Additionally, the housing includes a recessed portion where the aperture is located. The waist fan further includes a sealing member, which is movably connected to the housing and can switch between a sealed state where the sealing member is engaged in the recessed portion covering the aperture and an open state where the sealing member is detached from the recessed portion exposing the port assembly through the aperture. The waist fan further includes a battery electrically connected to the main circuit board. Furthermore, the waist fan further includes a display assembly electrically connected to the main circuit board and configured to display a fan speed level of the fan assembly and/or remaining battery power of the battery. At least a portion of the display assembly is exposed through a display opening on the housing. The display assembly includes a display element connected to the main circuit board and a light-transmitting plate installed in the display opening. The display element emits light through the light-transmitting plate. The display opening is located on the top plate. The sealing member is made of a flexible material. The inclusion of the recessed portion and the sealing member helps to isolate dust, moisture, and other contaminants, ensuring the safety of the port assembly without affecting structural integrity of the waist fan. Additionally, the display assembly allows users to monitor current operating status of the waist fan, enhancing the overall user experience.

In one embodiment, the housing includes a main housing and an air outlet member connected to the main housing. The air outlet member includes a circular inner wall that encircles the air outlet. This circular inner wall extends in a direction of the airflow out through the air outlet, which is the direction of the airflow from the air inlet to the air outlet. The air inlet and the air outlet are positioned opposite to each other, with the fan assembly located between them. The fan assembly is an axial fan assembly arranged between the air inlet to the air outlet. By configuring the fan assembly as an axial fan and aligning air inlet, the fan assembly and the air outlet along a same axis, the waist fan can achieve greater air output and higher efficiency.

In one embodiment, the fan assembly includes a fan housing and a blade assembly. The fan housing has a cavity where the blade assembly is located and mounted. The fan housing includes a circumferential sidewall structure and a top wall connected to the sidewall structure. The top wall includes a plurality of first air-concentrating plates arranged in a ring. A plurality of first air outlet holes are defined among the plurality of first air-concentrating plates. The fan assembly further includes an air-concentrating member positioned on the top wall. The air-concentrating member includes a plurality of second air-concentrating plates arranged in a ring. A plurality of second air outlet holes are defined among the plurality of second air-concentrating plates. The air-concentrating member further includes an air-concentrating bulge that protrudes away from the fan housing. An outer surface of the air-concentrating bulge is a partially spherical surface with an arc-shaped cross-section. Additionally, the fan assembly includes a pressurizing member located on the side of the air outlet adjacent to the blade assembly. An inner diameter of the pressurizing member gradually decreases in the direction of airflow out through the air outlet. The pressurizing member is connected between the air outlet member and the air-concentrating member. An inner diameter of an end of the pressurizing member adjacent to the air outlet member is equal to an inner diameter of a part of the air outlet member adjacent to the pressurizing member, ensuring a smooth connection between an inner surface of the air outlet member and an inner surface of the pressurizing member. By configuring the top wall, air-concentrating member, and pressurizing member, the airflow out from the fan assembly can be guided to the pressurizing member through the first air outlet holes and the second air outlet holes to be pressurized, which not only enhances the airflow but also reduces the temperature of the airflow, achieving rapid cooling. As a result, the waist fan provides stronger air output, quickly enhancing user comfort, improving air output efficiency, and improving user experience.

In one embodiment, the air outlet member further includes a circular top wall connected to the circular inner wall and an outer wall connected to the circular top wall and encircling an outer periphery of the circular inner wall. The outer wall is connected to the main housing. The circular top wall includes circular patterns, and the outer wall protrudes beyond the circular inner wall in the direction of airflow exiting through the air outlet member. The inner diameter of the circular inner wall ranges from. centimeters to centimeters. By configuring the air outlet member with the circular inner wall, the circular top wall including circular patterns, and the outer wall, the waist fan can achieve smoother air output, with air being concentrated and outputted through the air outlet, improving air output efficiency and enhancing user comfort.

In one embodiment, the main housing further includes a first lanyard hole configured to connect a first lanyard and a second lanyard hole configured to connect a second lanyard. Both the first lanyard hole and the second lanyard hole are located on the same side of the housing where the air outlet is positioned and are posited on two opposite sides of the air outlet respectively. The configuration of the first lanyard hole and the second lanyard hole enhances the portability of the waist fan while providing users with versatile usage options, making it more flexible, convenient, and user-friendly.

In one embodiment, the waist fan includes a first clamping member. The housing includes a clamping member fixing hole. The first clamping member includes a fixing end, a connecting portion connected to the fixing end, and a clamping portion connected to the connecting portion. The clamping portion is arranged opposite to the fixing end and is configured to together with the housing form a first clamping space to clamp a first external object. The waist fan further includes a stand member rotatably connected to the first clamping member, allowing the stand member to switch between a retracted state where the stand member is folded relative to the first clamping member and a supporting state where the stand member is positioned at a preset angle relative to the first clamping member. In the supporting state, the stand member, together with the housing, supports the waist fan on an external object. The configuration of the first clamping member and the stand member enables the waist fan to be clamped onto a first external object or supported on an external object, expanding its usage scope and enhancing product competitiveness.

In one embodiment, both the first clamping member and the stand member are made of metal materials. The waist fan further includes a second clamping member connected to the side of the housing opposite to the first clamping member. The second clamping member is configured to form a second clamping space together with the housing for clamping a second external object. A clamping direction of the first clamping space is opposite to that of the second clamping space. The second clamping member and a part of the housing connected to the second clamping member may be integrally formed by a same material; or the second clamping member and a part of the housing connected to the second clamping member can be formed individually and then be connected to each other. By arranging the second clamping member, the waist fan can be clamped onto the second external object and deliver airflow in a direction opposite to that of the first clamping member, thus further expanding the waist fan's usage scope. It provides users with more flexible and convenient usage options. Furthermore, the second clamping member and the part of the housing connected to the second clamping member being integrally formed by the same material; or the second clamping member and a part of the housing connected to the second clamping member being formed individually and then being connected to each other, keeps the overall structure of the waist fan simple and compact.

In one embodiment, the waist fan further includes a flexible protective sleeve that sleeves on an outer surface of the housing. The outer surface includes a main surface and a recessed surface connected to the main surface and recessed inward from the main surface. The flexible protective sleeve is positioned in a groove on the recessed surface, with an outer surface thereof aligning with the main surface. Additionally, an insertion hole is formed on the recessed surface, and a protrusion is formed on an inner side of the flexible protective sleeve and extends into the insertion hole. The arranging of the flexible protective sleeve effectively not only protects the waist fan from damage in case of accidental drops but also provides anti-slip properties, which is easier for users to grip the waist fan.

In one embodiment, the housing includes a first housing part and a second housing part. The first housing part and the second housing part are positioned opposite to each other and enclose the accommodating cavity. The first housing part and the second housing part are fixedly connected together via snaps and/or screws. When they are connected by screws, screw holes are located on the recessed surface and are concealed by the flexible protective sleeve. The arranging of the first housing part and the second housing part, and connecting the first housing part and the second housing part via snaps and/or screws, facilitates the disassembly and assembly of the waist fan during production, maintenance, and other processes. Additionally, the screw holes is covered by the flexible protective sleeve, which not only provides an aesthetic appearance of the waist fan but also protects the screws.

In one embodiment, the port assembly of the waist fan includes a first port and a second port. The first port is configured to connect to a first external device to supply power to the waist fan and/or to charge the waist fan, while the second port is configured to connect to a second external device to supply power to the second external device and/or to charge the second external device. The arranging of the first port and the second port enables the waist fan to supply power and/or charge both the first and second external devices, thereby increasing the waist fan's functionality, expanding the waist fan's usage scope, and enhancing the waist fan's competitiveness.

In one embodiment, the control assembly includes a charge and discharge management circuit. The charge and discharge management circuit includes a power input terminal, a battery charging terminal, and a discharging terminal. The power input terminal is connected to the first port to receive an external voltage, and the discharging terminal is connected to the second port to supply power to and/or charge the second external device through the second port. The battery charging terminal is connected to a battery of the waist fan. The control assembly further includes an overvoltage protection circuit. The overvoltage protection circuit includes a feedback terminal connected to the first port and an input terminal connected to the battery to obtain an operating voltage. The light-emitting assembly includes a plurality of first light-emitting elements connected in series to form a series circuit. Each first light-emitting element includes a power pin, an input pin, an output pin, and a ground pin. The power pins of the first light-emitting elements are used to receive a power supply voltage. The plurality of first light-emitting element includes a front light-emitting element located at one end of the series circuit, a rear light-emitting element located at another end of the series circuit, and middle light-emitting elements located between the front light-emitting element and the rear light-emitting element; the input pin of the front light-emitting element is configured to receive the power supply voltage; the output pin of the front light-emitting element or the output pin of each middle light-emitting elements is connected to the input pin of a next adjacent first light-emitting element, and the output pin of the rear first light-emitting element is left floating.

In one embodiment, the control assembly further includes a fan control circuit, a boost circuit, and a main control circuit. The battery is electrically connected to the fan assembly through the boost circuit. The fan control circuit includes a first switch. The first switch includes a first conduction terminal connected to the boost circuit, a second conduction terminal grounded, and a control terminal connected to the main control circuit. The main control circuit is configured to output a PWM control signal to the control terminal of the first switch. The control assembly further includes an indicator light circuit connected between the battery and ground. The indicator light circuit includes an indicator light and a second switch connected in series with the indicator light. The second switch includes a control terminal of the second switch connected to the main control circuit. The control assembly further includes a battery protection circuit. The battery protection circuit includes a third switch and a fourth switch. The third switch includes two conduction terminals of the third switch respectively connected between the battery and the first port and a control terminal of the third switch grounded via the fourth switch, and the control terminal of the fourth switch is connected to the main control circuit.

BRIEF DESCRIPTION OF THE DRAWINGS

In order to explain the technical solutions of the embodiments of the present invention more clearly, the following will briefly introduce the accompanying drawings used in the embodiments. Apparently, the drawings in the following description are only some embodiments of the present invention. Those of ordinary skill in the art can obtain other drawings based on these drawings without creative work.

DETAILED DESCRIPTION

Figure 1:
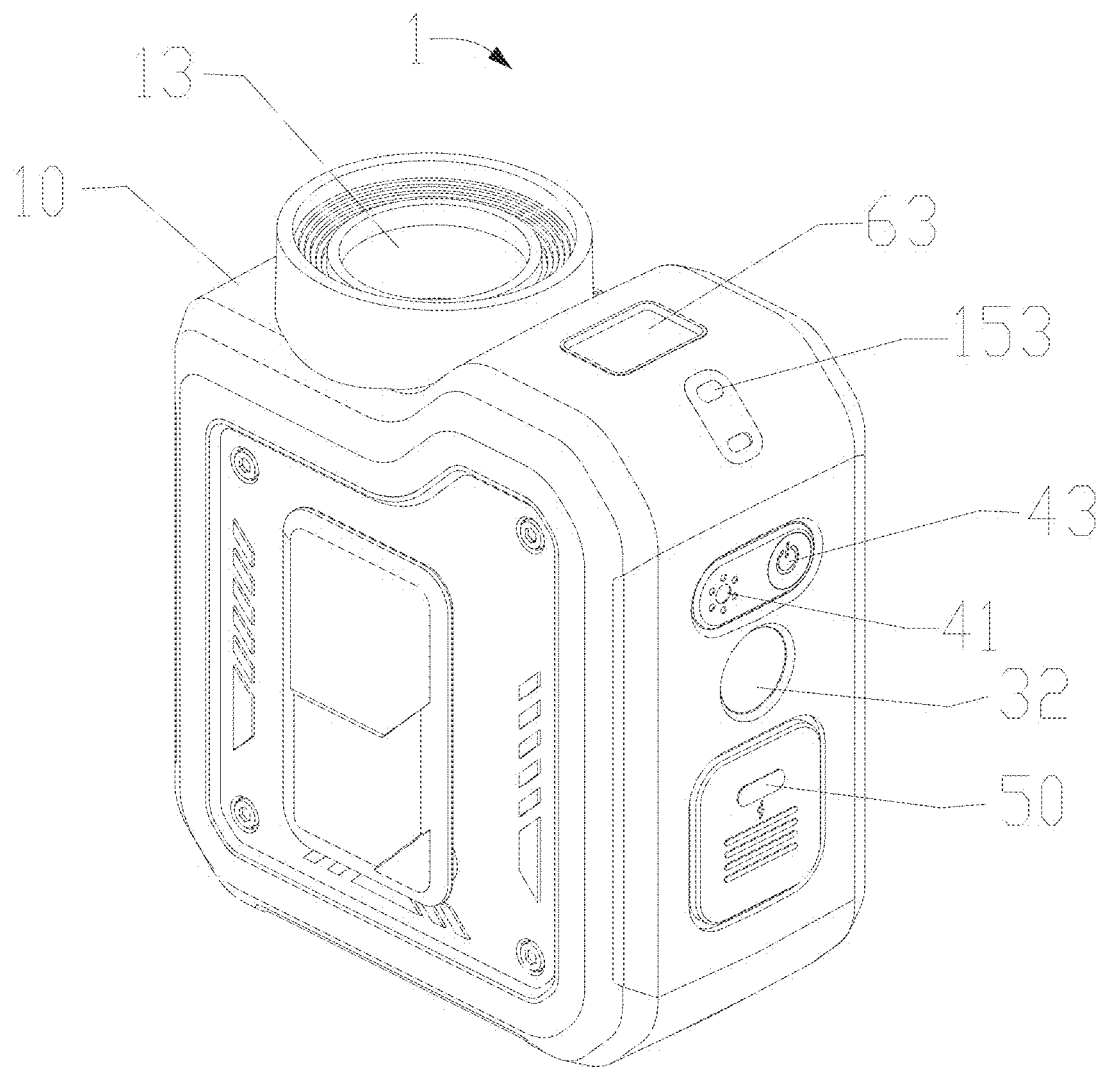
FIG. 1 is a schematic structural diagram of a waist fan according to an embodiment of the present disclosure.
Figure 2:
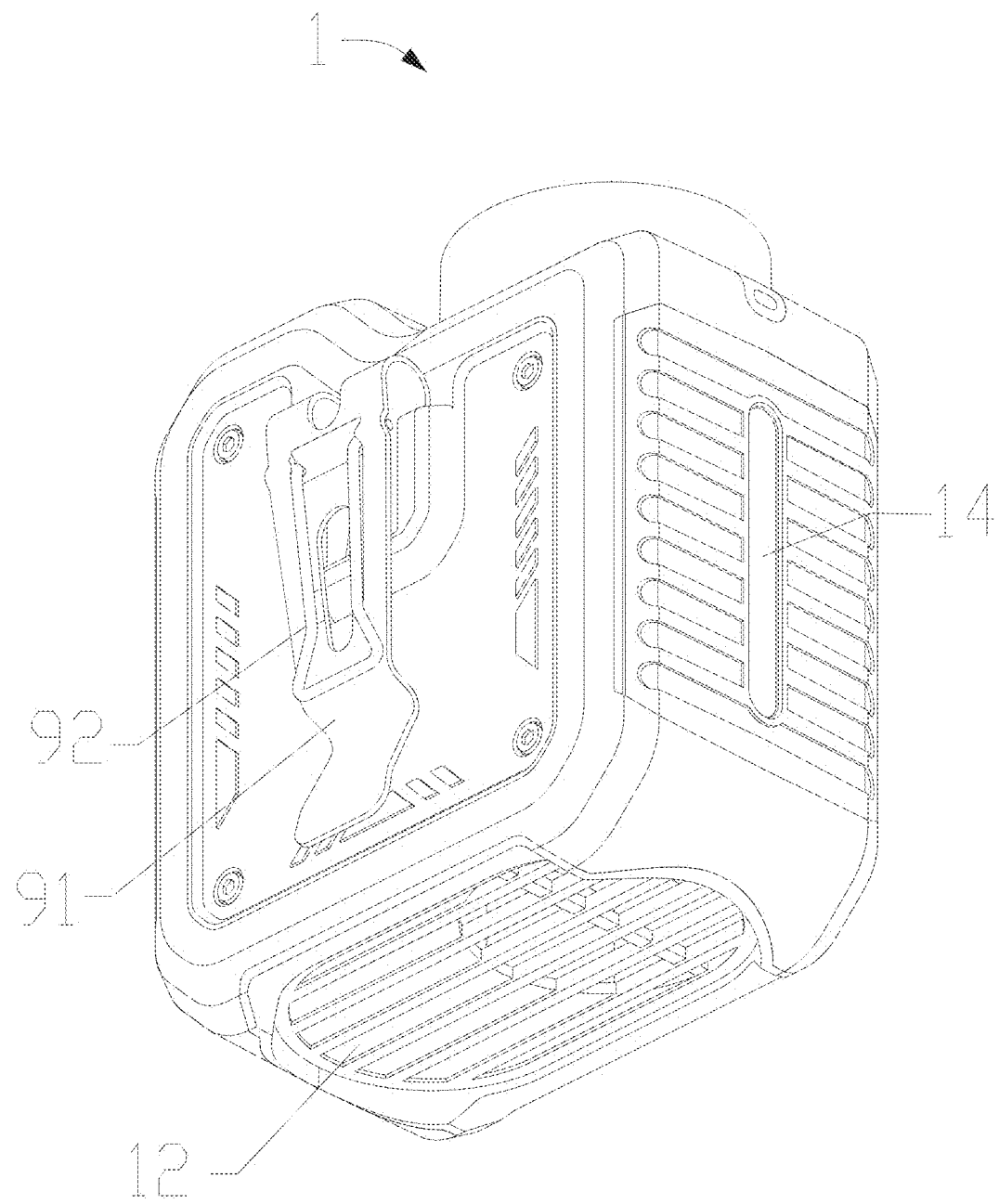
FIG. 2 is a schematic structural diagram of the waist fan from another angle according to an embodiment of the present disclosure.
Figure 3:
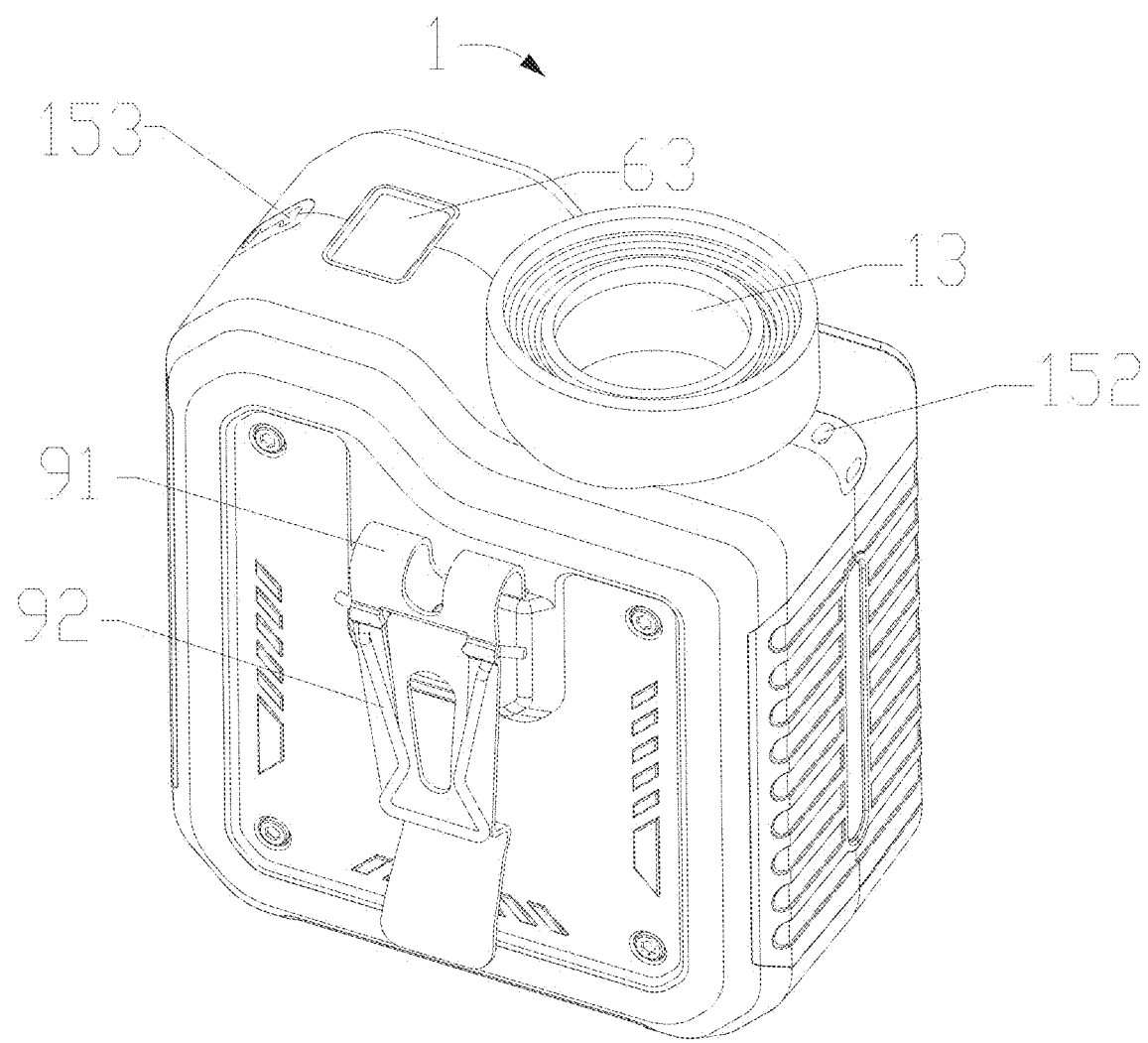
FIG. 3 is a schematic view of the waist fan from another angle according to an embodiment of the present disclosure.
Figure 4:
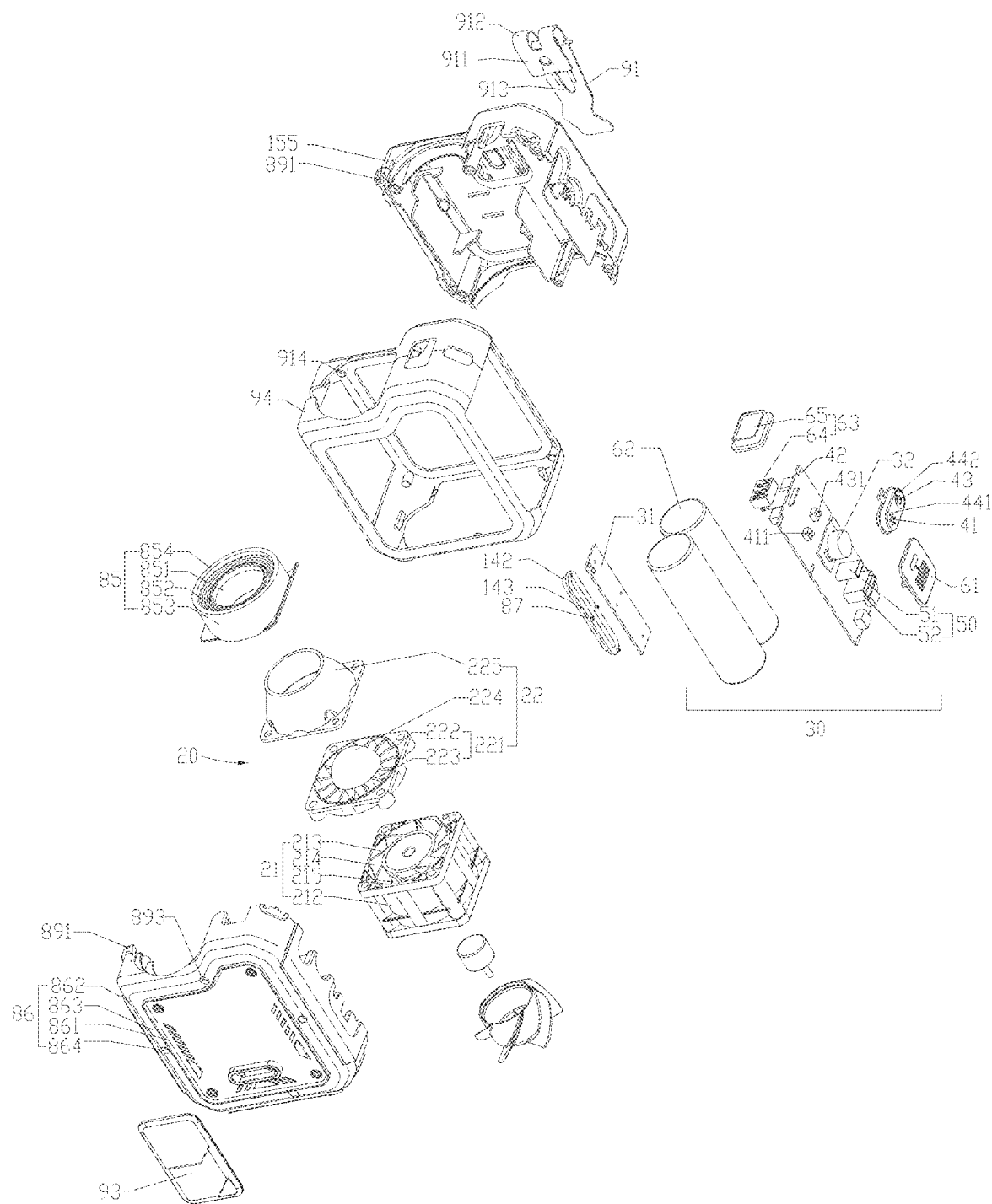
FIG. 4 is an exploded view of the waist fan according to an embodiment of the present disclosure.
Figure 5:
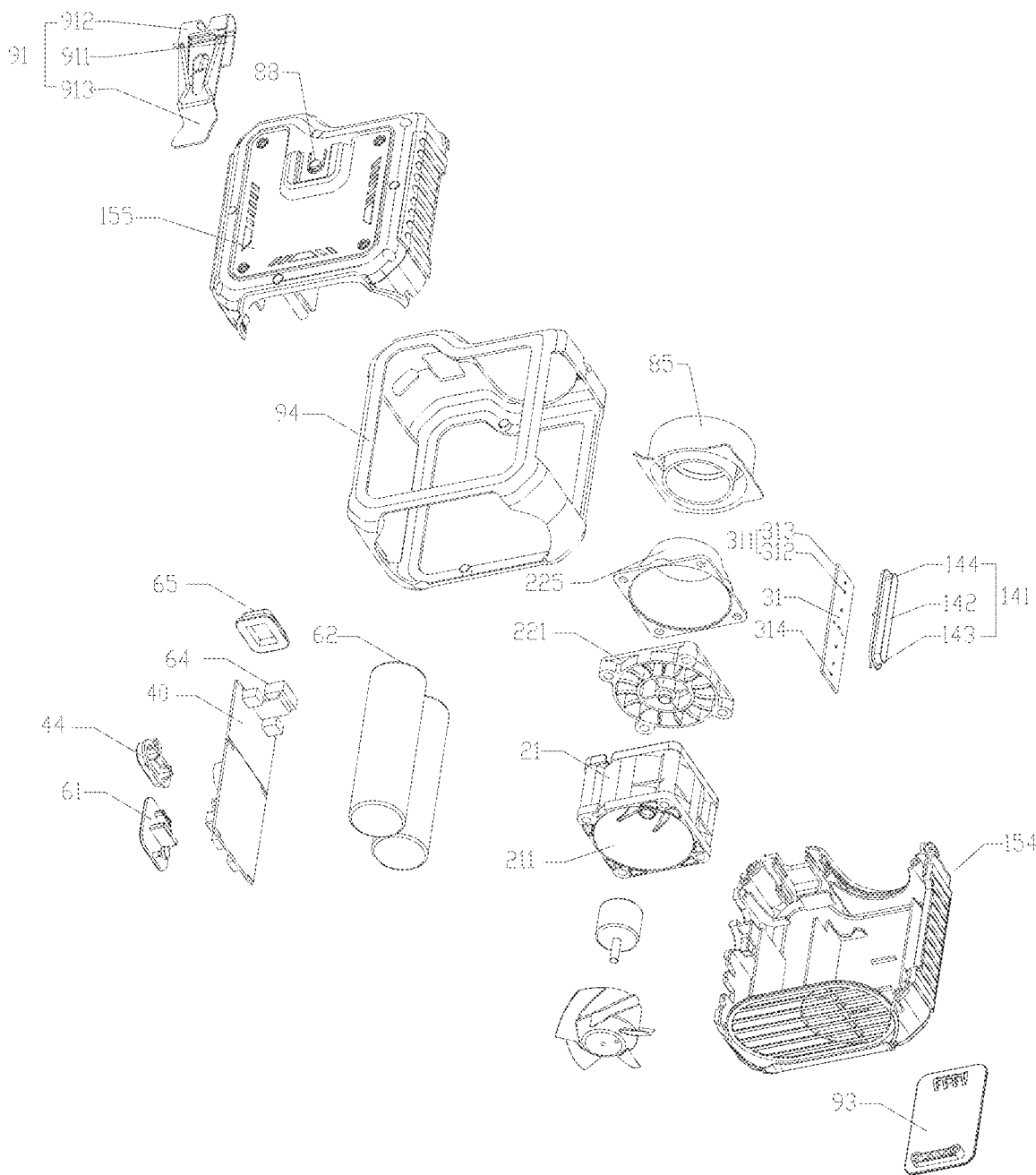
FIG. 5 is an exploded view of the waist fan from another angle according to an embodiment of the present disclosure.
Figure 6:
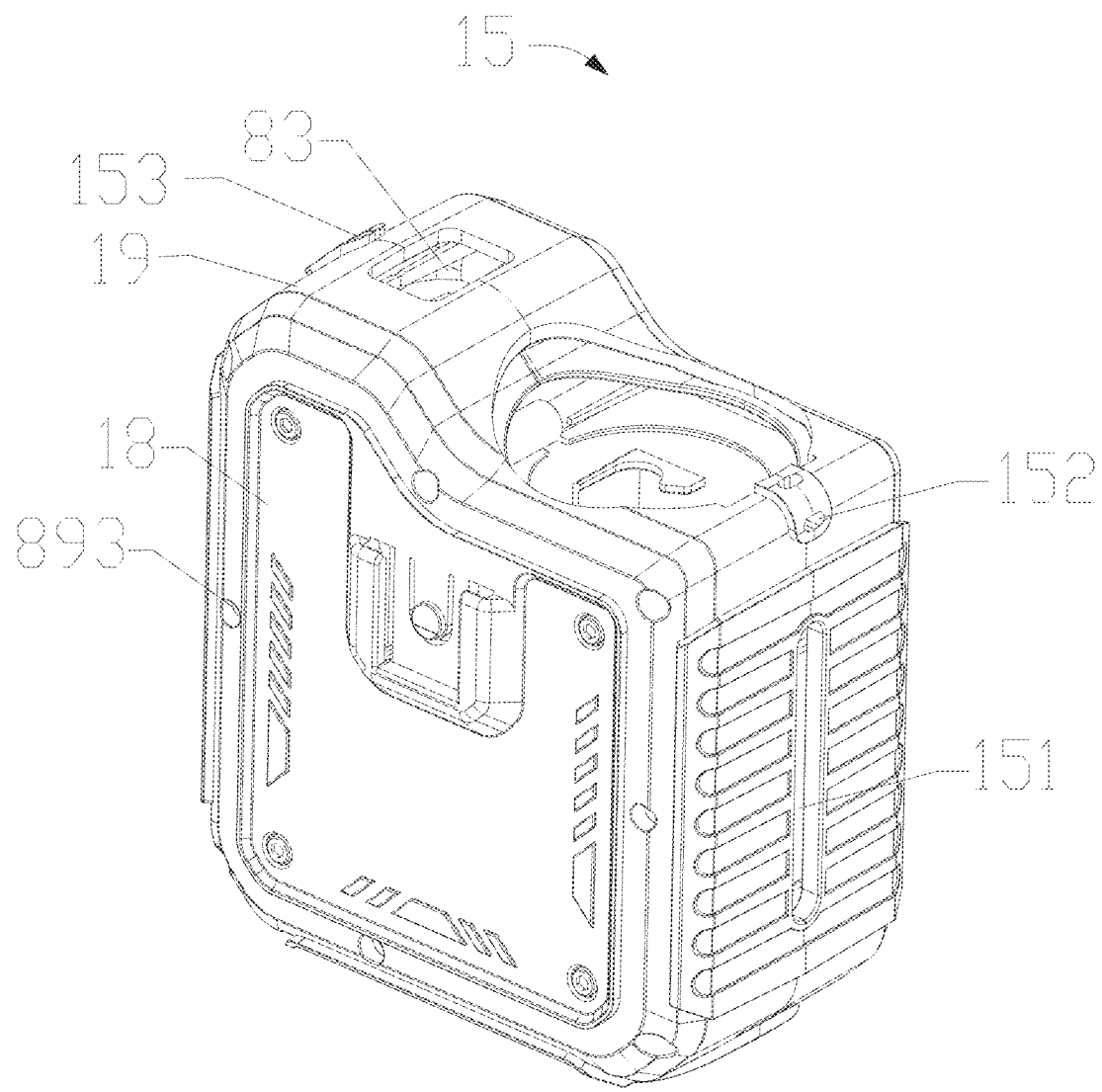
FIG. 6 is a schematic view a main housing of the waist fan according to an embodiment of the present disclosure.
Figure 7:
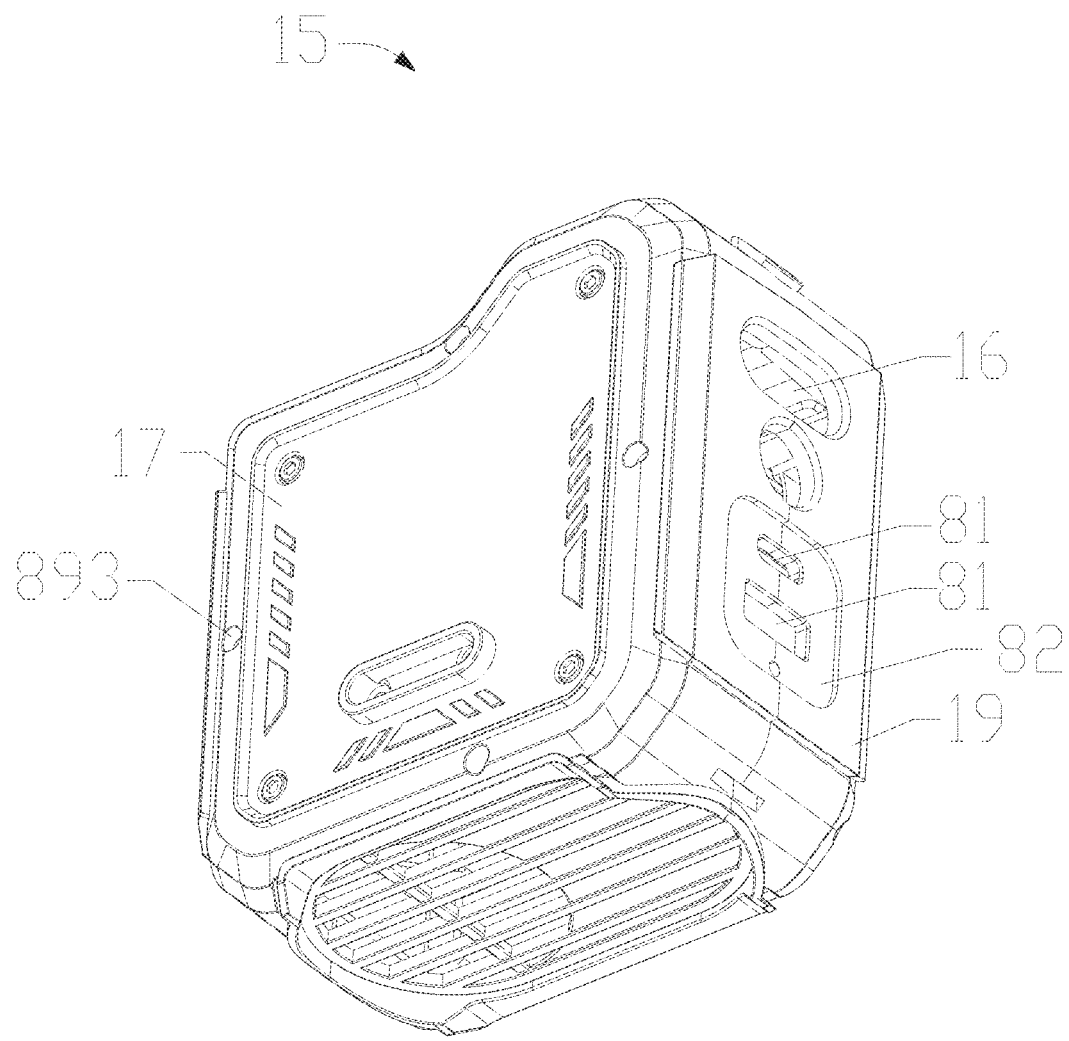
FIG. 7 is a schematic view of the main housing of the waist fan from another angle according to an embodiment of the present disclosure.

The technical solutions in the embodiments of the present invention will be clearly and completely described below in conjunction with the accompanying drawings in the embodiments of the present invention. Apparently, the described embodiments are only a part of the embodiments of the present invention, rather than all the embodiments. Based on the embodiments in the present invention, all other embodiments obtained by those ordinarily skilled in the art without doing creative work shall fall within the protection scope of the present invention.

Please referring to FIGS. 1-7, a waist fan by an embodiment of the present disclosure includes a housing 10, a fan assembly 20, a light-emitting assembly 30, and a control assembly 40. The housing 10 defines an accommodating cavity 11, an air inlet 12 communicated with the accommodating cavity 11, and an air outlet 13 communicated with the accommodating cavity 11. The fan assembly 20 is accommodated in the accommodating cavity 11 and is configured to guide air from the air inlet 12 to the air outlet 13. The control assembly 40 is configured to be electrically connected to the light-emitting assembly 30 and is configured to control the light-emitting assembly 30 to emit dazzling light of different colors and/or flashing light for warning purposes.

It should be understood that during hot weather conditions, users can utilize the waist fan 1 for cooling to enhance personal comfort. The fan assembly 20 of the waist fan 1 is positioned in the accommodating cavity 11, which constitutes a semi-enclosed space. During a process where the fan assembly 20 directs air from the air inlet 12 to the air outlet 13, an airflow path of the fan assembly 20 remains unaffected by external air, which can make airflow out from the fan assembly 20 more concentrate, thus improving ventilation efficiency, increasing cooling speeds, and saving energy. Additionally, the waist fan 1 in the embodiment is equipped with the light-emitting assembly 30 that can emit dazzling light in different colors under control of the control assembly 40, making the device more visually striking to better meet users' personalized needs and to enhance its entertainment value. Furthermore, the light-emitting assembly 30 can emit flashing light for warning purposes under the control of the control assembly 40, which allows users to take the waist fan 1 as a safety warning device in emergencies or hazardous situations, thereby ensuring personal safety. By incorporating the light-emitting assembly 30, the waist fan 1 of the embodiment of the present disclosure allows users to control the waist fan 1 to emit dazzling light in different colors and/or flashing light for warning purposes, which broadens the waist fan's application scope while meeting personalized user's preferences, ultimately enhancing user experience and market demand.

Specifically, the "dazzling light in different colors" include first-color light, second-color light, and/or Marquee-style light (color-changing flashing light). The first-color light and the second-color light are in different single colors. The Marquee-style light includes flashing light continuously alternating colors according to present programs or data. It can be understood that when being used the waist fan can be controlled to emit flashing light in a first color or to emit flashing light in a second color or to emit flashing light alternately switching between the first color and the second color, which can enhance the waist fan's entertainment value and personalized features to meet diverse consumer demands. Furthermore, the light-emitting assembly 30 includes at least one first light-emitting element 31 arranged in the accommodating cavity 11. The housing 10 includes a light-transmitting region 14 corresponding to the at least one first light-emitting element 31. Light emitted by the at least one first light-emitting element 31 passes through the light-transmitting region 14 to an outside of the housing to form the flashing light in different colors.

Specifically, the at least one light-emitting element 31 includes a light source assembly 311 configured to emit light in multiple colors. The light source assembly 311 includes at least two sub-light sources 312 configured to be controlled individually to emit light in two different colors respectively. Each sub-light source 312 is configured to emit light in a specific light, thus enabling the light source assembly 311 to emit light in multiple colors. The number of the at least one first light-emitting element 31 is multiple, and each first light-emitting element 31 includes a light source assembly 311 capable of emitting light in multiple colors. Multiple first light-emitting elements are arranged in a predetermined direction. By configuring each first light-emitting element 31 to correspond to one light source assembly 311, and each light source assembly 311 including multiple sub-light sources 312 that can be individually controlled, and with multiple first light-emitting elements 31 in place, fault tolerance of the light-emitting assembly 30 is significantly enhanced. If one of the first light-emitting elements 31 fails, it does not affect operation of other first light-emitting elements 31, which can ensure that overall functionality of the light-emitting assembly 30 remains working normally, thus improving the service life of the waist fan 1 and improving user experience.

Furthermore, the housing 10 includes a main housing 15 with an opening 151. The light-transmitting region 14 is located in the opening 151. The light-transmitting region 14 includes a lamp cover 141 installed in the opening 151. The lamp cover 141 is a translucent casing and includes a cover body portion 142 positioned in the opening 151 and a mounting portion 143 connected to a side of the cover body portion 142 that is adjacent to the at least one first light-emitting element 31. The light-emitting assembly 30 further includes a light-emitting element circuit board 313 and the at least one first light-emitting element 31 is arranged on a surface of the light-emitting element circuit board 313 adjacent to the lamp cover 141. The mounting portion 143 is connected to the light-emitting element circuit board 313. A stepped portion 144 is formed by the mounting portion 143 and the cover body portion 142. The main housing 15 is secured to the stepped portion 144, thereby fixing the cover body portion 142 in the opening 151, with the mounting portion 143 in contact with an inner surface of the main housing 15. One of the mounting portion 143 and the light-emitting element circuit board 313 includes a first fixing portion 87, the other of the mounting portion 143 and the light-emitting element circuit board 313 includes a second fixing portion 314. The first fixing portion 87 is securely connected to the second fixing portion 314, thus fixing the mounting portion 143 to the light-emitting element circuit board 313. In the embodiment, the cover body portion 142 of the lamp cover 141 is clamped into the opening 151 of the main housing 15, in this way, the cover body portion 142 is fixed in the opening 151. The main housing 15 is clamped to the stepped portion 144 formed by the mounting portion 143 and the cover body portion 142, ensuring the stable fixation of the lamp cover 141 onto the main housing 15. Meanwhile, the mounting portion 143 and the light-emitting element circuit board 313 are fixed together via the first fixing portion 87 and the second fixing portion 314, resulting in a simple, compact, and stable and secure installation of the entire light-emitting assembly 30.

Furthermore, the light-emitting assembly 30 further includes a second light-emitting element 32 configured to emit warning flashing light in a first lighting mode and to emit an illumination light in a second lighting mode. The warning flashing light is white flashing light, while the illumination light is white illumination light. The at least one first light-emitting element 31 is positioned on a first side of the housing 10, whereas the second light-emitting element 32 is located on a second side of the housing 10, opposite to the first side. It can be understood that the waist fan 1 possesses both illumination and warning functions. When a user requires illumination from the waist fan 1, the waist fan can be controlled to enter the second lighting mode, where the second light-emitting element 32 can continuously emit a white illumination light. When the user is in a special environment and needs to attract or alert others, the waist fan 1 can be controlled to enter the first lighting mode, where the second light-emitting element 32 can emit the white flashing light. By incorporating the second light-emitting element 32 and configuring the first and second lighting modes, the waist fan 1 can achieve both illumination and warning functions, thus enhancing the waist fan's practicality.

Furthermore, the control assembly 40 includes a first control button 41 and a main circuit board 42. The first control button 41 is arranged on the housing 10 and is electrically connected to the main circuit board 42. The main circuit board 42 is electrically connected to the light-emitting assembly 30. The first control button 41 is configured to be operated by the user to control illumination of the light-emitting elements. When the first control button 41 is applied on a first operation, it generates a first control signal. Based on the first control signal, the main circuit board 42 controls switching on, switching off, or a light color of the at least one first light-emitting element 31. When the first control button 41 is applied on a second operation, it generates a second control signal, based on which the main circuit board 42 controls switching on, switching off, or lighting modes of the of the second light-emitting element 32. One of the first and second operations is a short press with a first operation duration, while the other is a long press with a second operation duration, where the second operation duration is longer than the first operation duration. In the embodiment, the first and second operations can be distinguished by the operation duration on the first control button 41. Specifically, the first operation is a long press with the second operation duration, and the second operation is a short press with the first operation duration. More specifically, the short press with the first operation duration is 1 second, while the long press with the second operation duration is 1 to 3 seconds.

It can be understood that when operating the waist fan 1, the user can apply a long press on the first control button 41 for about 2 seconds. This action activates the at least one first light-emitting element 31, causing a first one of the sub-light sources 312 to emit light of a first color. Pressing the first control button 41 again for about 2 seconds will deactivate the currently illuminated sub-light source 312 and activate a second one of the sub-light sources 312, which then emits light of a second color different from the first color. Pressing the button once more for about 2 seconds will activate both the first one and the second one of the sub-light sources 312, causing them to flash alternately to achieve a marquee-style light effect. Pressing the button again for about 2 seconds will deactivate all sub-light sources 312, resulting in no light emission from the at least one first light-emitting element 31. The above description outlines the operation of the first light-emitting element 31, which emits light of two different colors in the embodiment. However, in other embodiments, the first light-emitting element 31 can emit more than two colors, operations of which may be similar with that described above and not elaborated further here. When needs to use the waist fan 1 for illumination, the user can apply a short press on the first control button 41 for a short operation duration. The short press action switches the second light-emitting element 32 to the second lighting mode, where the second light-emitting element 32 continuously emits white illumination light. When needs to use the waist fan 1 as a warning device, the user can quickly press (short press) the first control button 41 again. This switches the second light-emitting element 32 to the first lighting mode, causing it to flash white light as a warning signal to others nearby. Pressing the first control button 41 once more will deactivate the second light-emitting element 32, resulting in no light emission. By incorporating the first control button 41 and using long and short presses to control the activation, deactivation, lighting states, and modes of the first and second light-emitting elements 31 and 32, the operation is simple, quick, and provides a better user experience.

Furthermore, the control assembly 40 further includes a second control button 43 arranged on the housing 10. The second control button is electrically connected to the main circuit board 42 and configured to be operated by the user to control activation, deactivation, or a rotational speed of the fan assembly 20. The first control button 41 includes a first trigger portion 411 positioned on the main circuit board 42, while the second control button 43 includes a second trigger portion 431 located on the main circuit board 42. The first control button 41 and the second control button 43 share a same operation keypad 44. The housing 10 defines a button hole 16, through which the operation keypad 44 is installed. A first end 441 of the operation keypad 44 corresponds to the first trigger portion 411, and a second end 442 of the operation keypad 44 corresponds to the second trigger portion 431. When the first end 441 is operated, the first trigger portion 411 is activated, generating the first control signal. Similarly, when the second end 442 is operated, the second trigger portion 431 is triggered, generating a second control signal. It can be understood that when wants to use the waist fan 1 for air circulation, the user can press the second control button 43 to control the activation, deactivation, or the rotational speed of the fan assembly 20. By incorporating both the first control button 41 and the second control button 43, the user can independently operate the fan assembly 20 and the first and second light-emitting elements 31 and 32 while using the waist fan 1. That is, the user can activate, deactivate, or switch the lighting modes of the waist fan without affecting the waist fan's air circulation function, and the user can activate, deactivate, or the rotational speed of the fan assembly without affecting lighting states of the first light-emitting element 31 and the second light-emitting element 32. Configurations of the first control button and the second control button enhances convenience and simplicity of operating the waist fan. Moreover, the operation keypad 44 is shared between the first control button and the second control button, which contributes to a simpler, more compact structure of the waist fan 1, facilitating user operation and enhancing the overall user experience.

Furthermore, the housing 10 consists of a top plate 17, a bottom plate 18, and a side panel structure 19 connected between the top plate 17 and the bottom plate 18. Both the first control button 41 and the second control button 43 are positioned on the side panel structure 19. The main circuit board 42 is adjacent to the side panel structure 19 and extends from the bottom plate 18 to the top plate 17. The second light-emitting element 32 is further arranged on the side panel structure 19. The waist fan 1 further includes a port assembly 50, which is exposed through an aperture 81 on the housing 10 to facilitate a connection with other electronic devices via an external data cable. The port assembly 50, the second light-emitting element 32, the first control button 41, and the second control button 43 are all located on the same side of the side panel structure 19, arranged in order from the bottom plate 18 to the top plate 17. Additionally, the housing 10 includes a recessed portion 82 where the aperture 81 is located. The waist fan 1 further includes a sealing member 61, which is movably connected to the housing 10 and can switch between a sealed state where the sealing member 61 is engaged in the recessed portion 82 covering the aperture 81 and an open state where the sealing member 61 is detached from the recessed portion 82 exposing the port assembly 50 through the aperture 81. The waist fan 1 further includes a battery 62 electrically connected to the main circuit board 42. Furthermore, the waist fan 1 further includes a display assembly 63 electrically connected to the main circuit board 42 and configured to display a fan speed level of the fan assembly 20 and/or remaining battery power of the battery 62. At least a portion of the display assembly 63 is exposed through a display opening 83 on the housing 10. The display assembly 63 includes a display element 64 connected to the main circuit board 42 and a light-transmitting plate 65 installed in the display opening 83. The display element 64 emits light through the light-transmitting plate 65. The display opening 83 is located on the top plate 17. The sealing member 61 is made of a flexible material. The inclusion of the recessed portion 82 and the sealing member 61 helps to isolate dust, moisture, and other contaminants, ensuring the safety of the port assembly 50 without affecting structural integrity of the waist fan 1. Additionally, the display assembly 63 allows users to monitor current operating status of the waist fan 1, enhancing the overall user experience.

Furthermore, the housing 10 includes a main housing 15 and an air outlet member 85 connected to the main housing 15. The air outlet member 85 includes a circular inner wall 851 that encircles the air outlet 13. This circular inner wall 851 extends in a direction of the airflow out through the air outlet 13, which is the direction of the airflow from the air inlet 12 to the air outlet 13. The air inlet 12 and the air outlet 13 are positioned opposite to each other, with the fan assembly 20 located between them. The fan assembly 20 is an axial fan assembly 20 arranged between the air inlet 12 to the air outlet 13. By configuring the fan assembly 20 as an axial fan and aligning air inlet 12, the fan assembly 20 and the air outlet 13 along a same axis, the waist fan 1 can achieve greater air output and higher efficiency.

Figure 8:
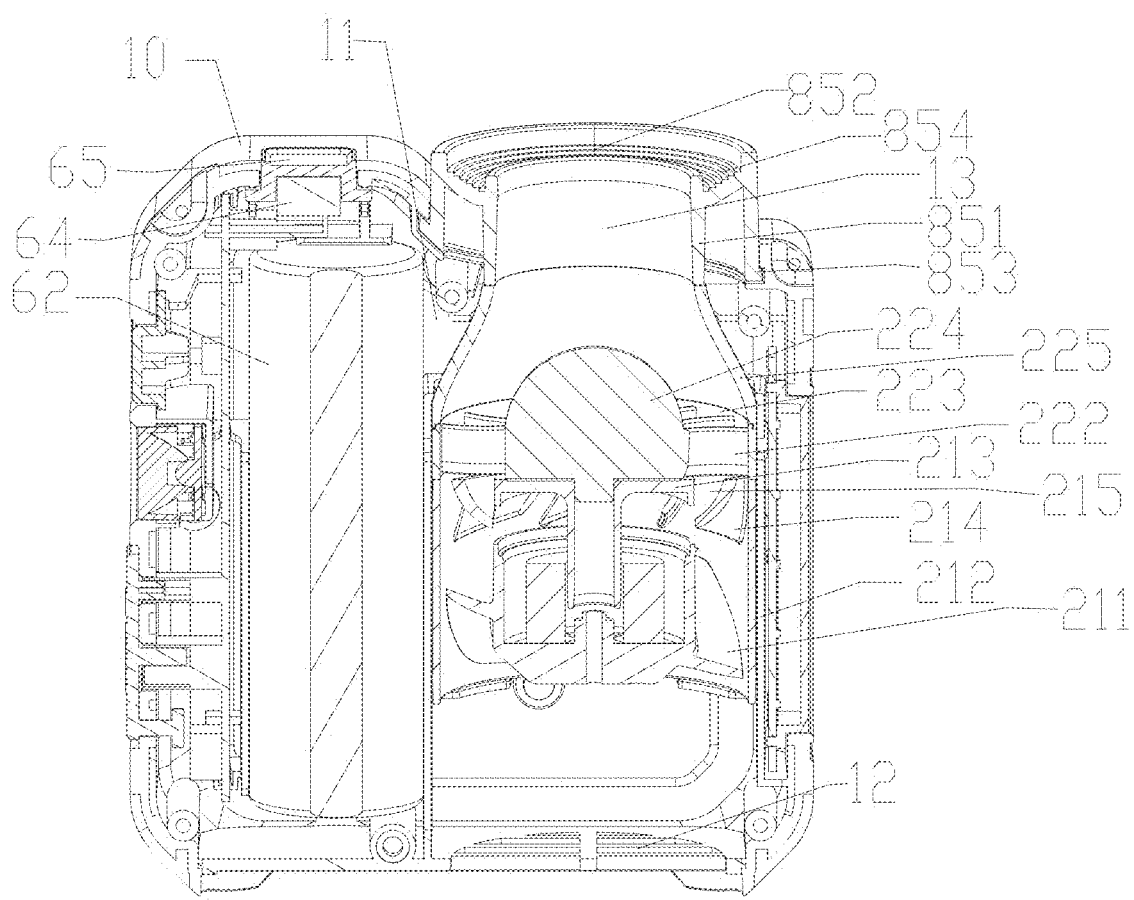
FIG. 8 is a cross-sectional view of the waist fan according to an embodiment of the present disclosure.

Furthermore, referring to FIG. 8, the fan assembly 20 includes a fan housing 21 and a blade assembly 22. The fan housing 21 has a cavity 211 where the blade assembly 22 is located and mounted. The fan housing 21 includes a circumferential sidewall structure 212 and a top wall 213 connected to the sidewall structure 212. The top wall 213 includes a plurality of first air-concentrating plates 214 arranged in a ring. A plurality of first air outlet holes 215 are defined among the plurality of first air-concentrating plates 214. The fan assembly 20 further includes an air-concentrating member 221 positioned on the top wall 213. The air-concentrating member 221 includes a plurality of second air-concentrating plates 222 arranged in a ring. A plurality of second air outlet holes 223 are defined among the plurality of second air-concentrating plates 222. The air-concentrating member 221 further includes an air-concentrating bulge 224 that protrudes away from the fan housing 21. An outer surface of the air-concentrating bulge 224 is a partially spherical surface with an arc-shaped cross-section. Additionally, the fan assembly 20 includes a pressurizing member 225 located on the side of the air outlet 13 adjacent to the blade assembly 22. An inner diameter of the pressurizing member 225 gradually decreases in the direction of airflow out through the air outlet 13. The pressurizing member 225 is connected between the air outlet member 85 and the air-concentrating member 221. An inner diameter of an end of the pressurizing member 225 adjacent to the air outlet member 85 is equal to an inner diameter of a part of the air outlet member 85 adjacent to the pressurizing member 225, ensuring a smooth connection between an inner surface of the air outlet member 85 and an inner surface of the pressurizing member 225. By configuring the top wall 213, air-concentrating member 221, and pressurizing member 225, the airflow out from the fan assembly 20 can be guided to the pressurizing member 225 through the first air outlet holes 215 and the second air outlet holes 223 to be pressurized, which not only enhances the airflow but also reduces the temperature of the airflow, achieving rapid cooling. As a result, the waist fan 1 provides stronger air output, quickly enhancing user comfort, improving air output efficiency, and improving user experience.

Furthermore, the air outlet member 85 further includes a circular top wall 852 connected to the circular inner wall 851 and an outer wall 853 connected to the circular top wall 852 and encircling an outer periphery of the circular inner wall 851. The outer wall 853 is connected to the main housing 15. The circular top wall 852 includes circular patterns 854, and the outer wall 853 protrudes beyond the circular inner wall 851 in the direction of airflow exiting through the air outlet member 85. The inner diameter of the circular inner wall 851 ranges from 1.5 centimeters to 5 centimeters. By configuring the air outlet member 85 with the circular inner wall 851, the circular top wall 852 including circular patterns 854, and the outer wall 853, the waist fan 1 can achieve smoother air output, with air being concentrated and outputted through the air outlet 13, improving air output efficiency and enhancing user comfort.

Furthermore, the main housing 15 further includes a first lanyard hole 152 configured to connect a first lanyard and a second lanyard hole 153 configured to connect a second lanyard. Both the first lanyard hole 152 and the second lanyard hole 153 are located on the same side of the housing 10 where the air outlet 13 is positioned and are posited on two opposite sides of the air outlet 13 respectively. It can be understood that the first lanyard hole 152 and the second lanyard hole 153 of the waist fan 1 offer users multiple lanyard attachment options, enabling them to wear the fan in various ways. For instance, users can hang the fan around their neck or arm by attaching a lanyard to either the first lanyard hole 152 or the second lanyard hole 153. Alternatively, they can attach lanyards to both holes to hang the fan around their neck or waist, facilitating portability and allowing the fan to be used as a neck fan or a waist fan, freeing their hands. The configuration of the first lanyard hole 152 and the second lanyard hole 153 enhances the portability of the waist fan 1 while providing users with versatile usage options, making it more flexible, convenient, and user-friendly.

Figure 9:
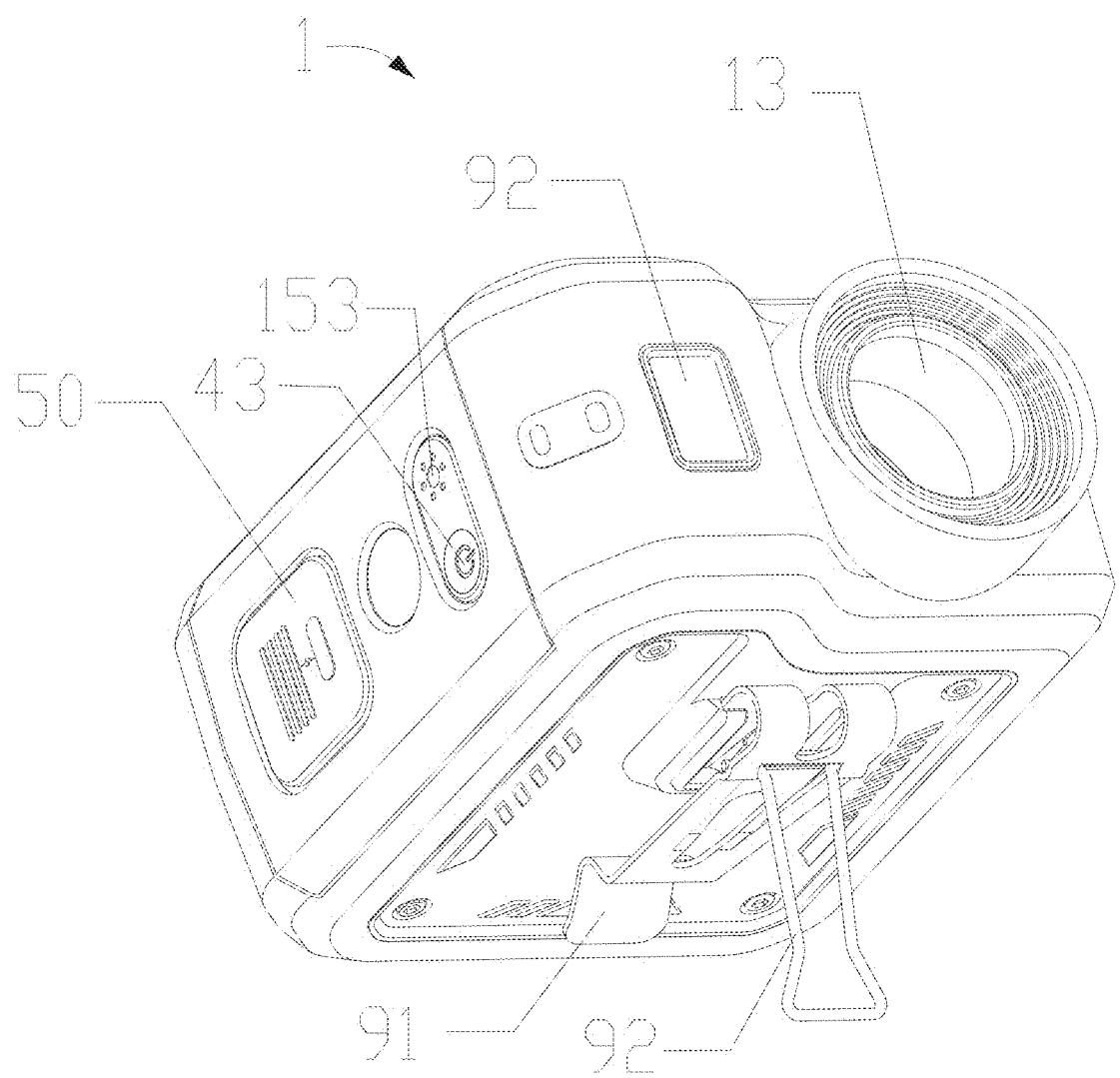
FIG. 9 is a schematic view of the waist fan in a supporting state according to an embodiment of the present disclosure.
Figure 10:
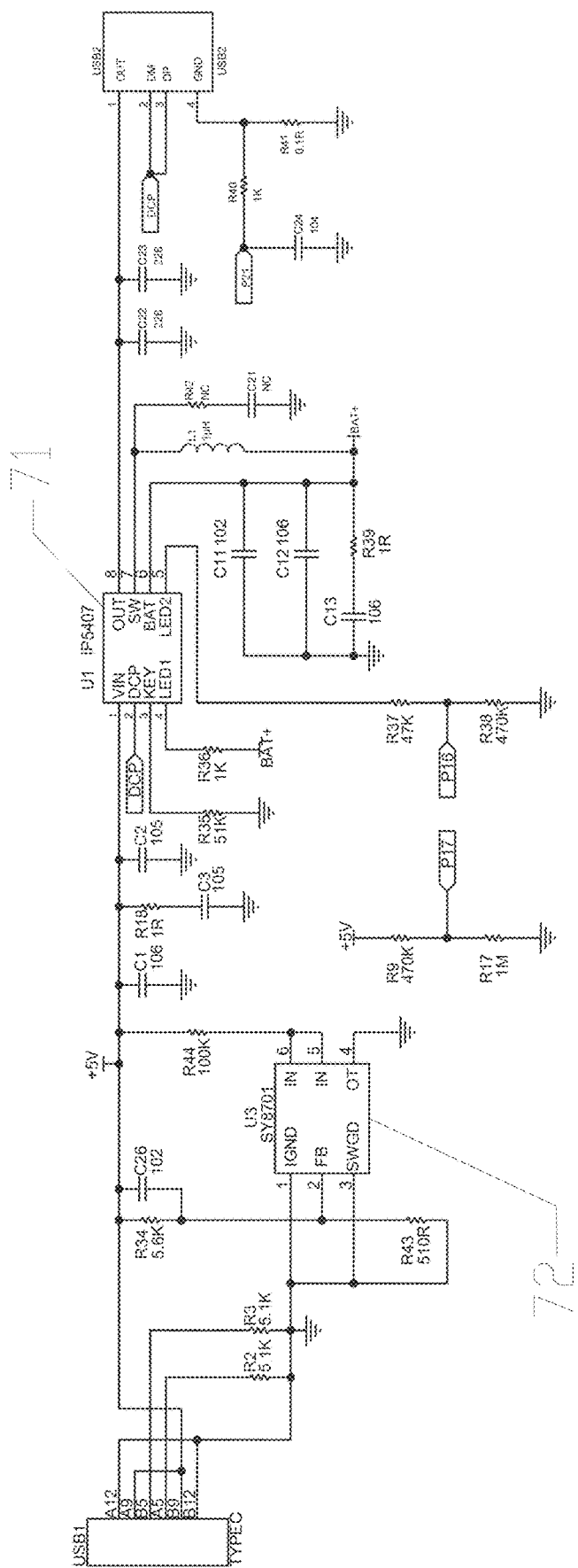
FIG. 10 is a schematic view of a charge and discharge management circuit and an overvoltage protection circuit of the waist fan according to an embodiment of the present disclosure.
Figure 11:
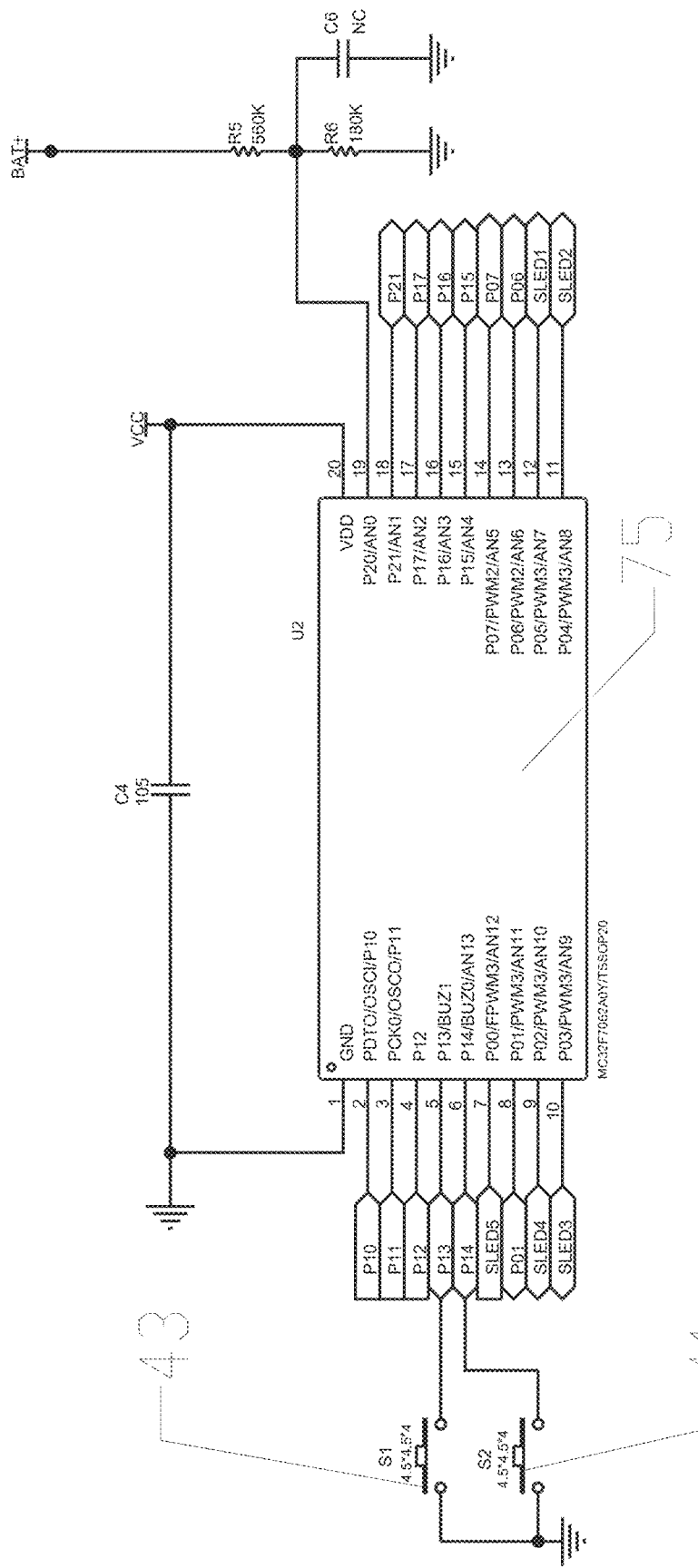
FIG. 11 is a schematic view of a main control circuit of the waist fan according to an embodiment of the present disclosure.
Figure 12:
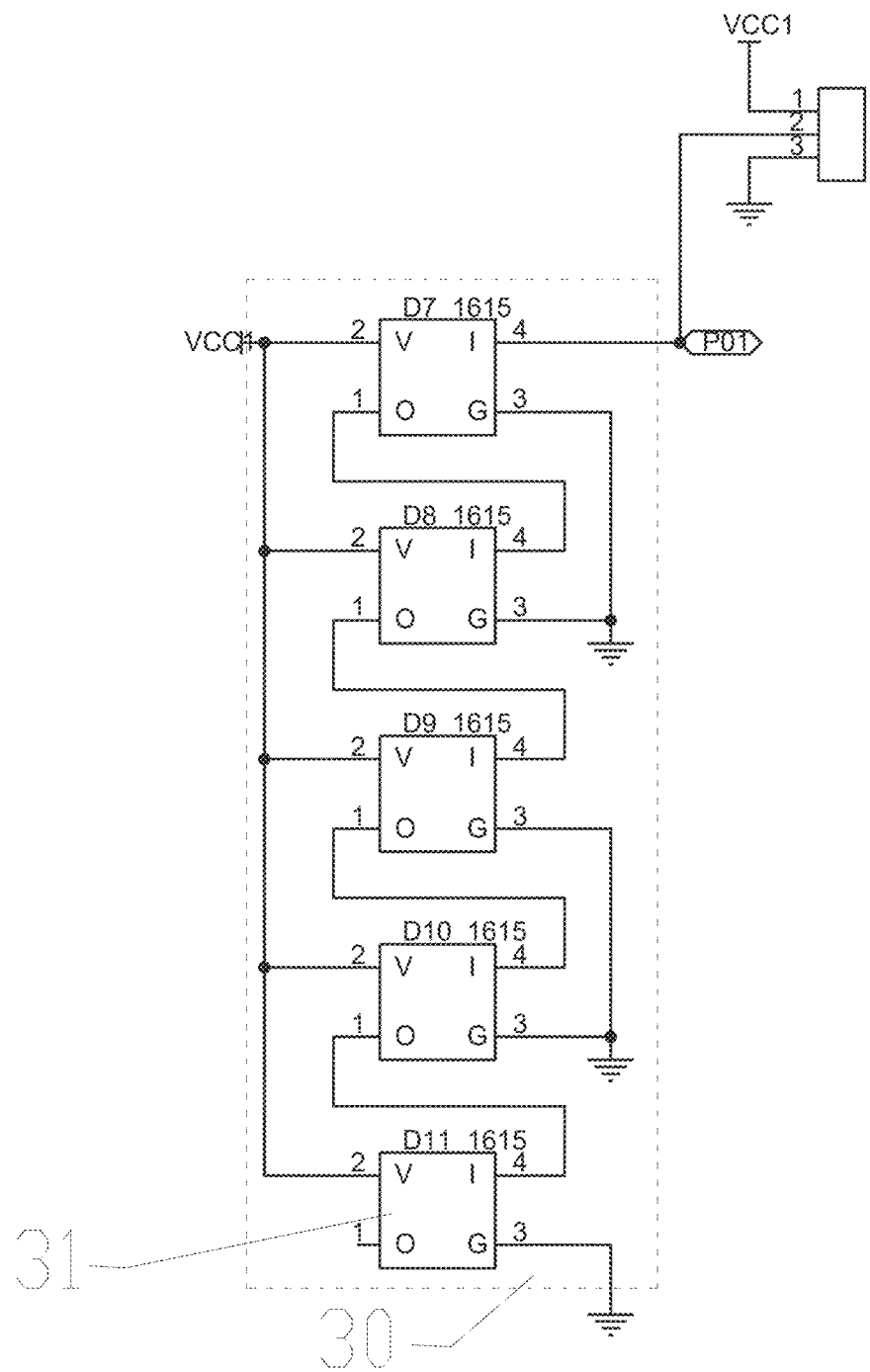
FIG. 12 is a schematic view of a first light-emitting element of a light-emitting assembly of the waist fan according to an embodiment of the present disclosure.
Figure 13:
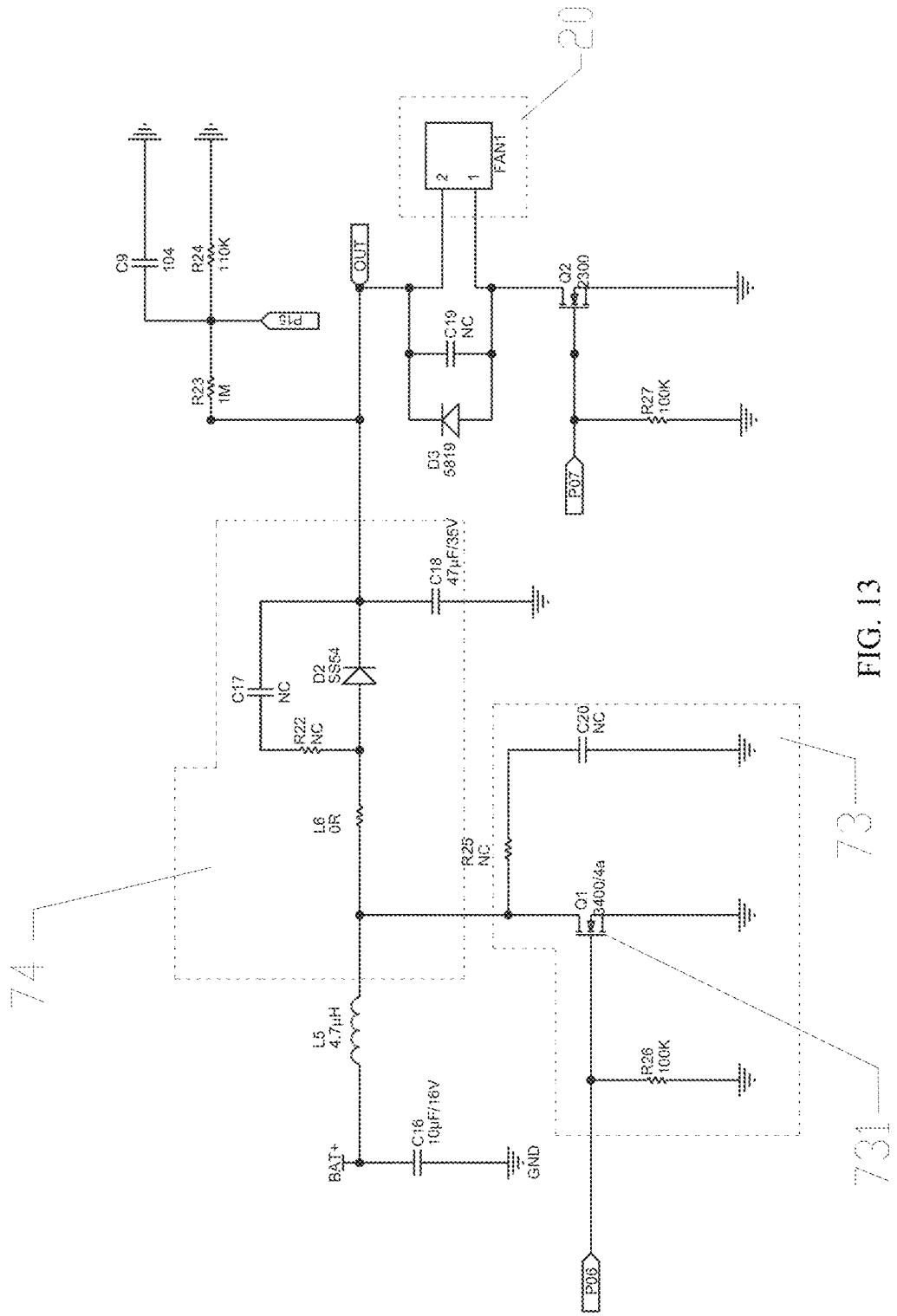
FIG. 13 is a schematic view of a fan control circuit of the waist fan according to an embodiment of the present disclosure.
Figure 14:
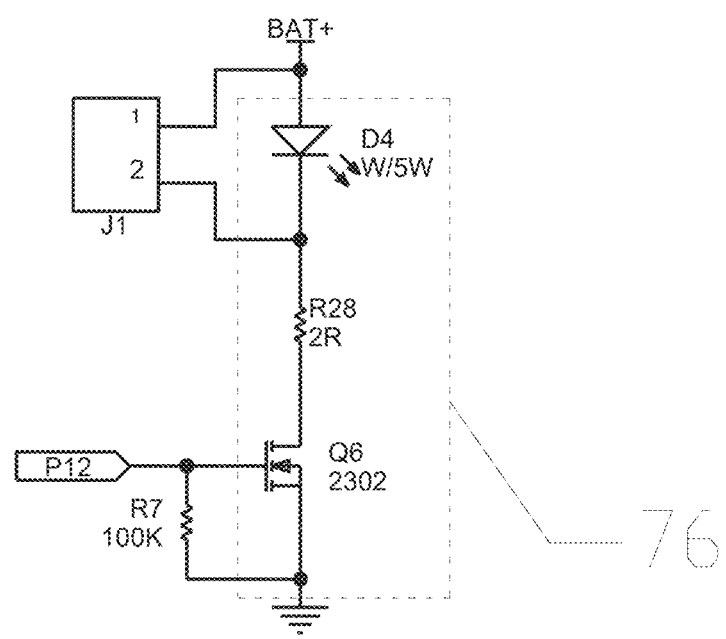
FIG. 14 is a schematic view of an indicator light circuit of the waist fan according to an embodiment of the present disclosure.
Figure 15:
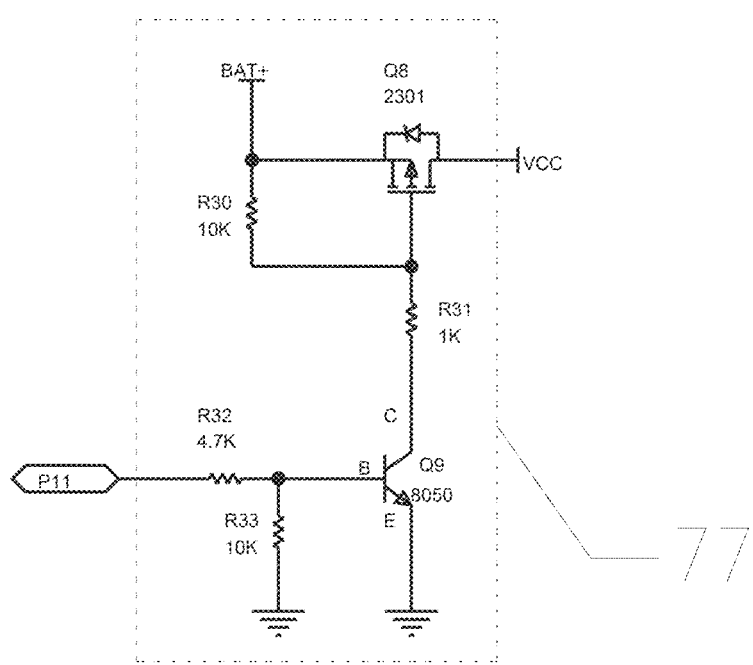
FIG. 15 is a schematic view of a battery protection circuit of the waist fan according to an embodiment of the present disclosure.

Additionally, the waist fan 1 includes a first clamping member 91. The housing 10 includes a clamping member fixing hole 88. The first clamping member 91 includes a fixing end 911, a connecting portion 912 connected to the fixing end 911, and a clamping portion 913 connected to the connecting portion 912. The clamping portion 913 is arranged opposite to the fixing end 911 and is configured to together with the housing 10 form a first clamping space to clamp a first external object. The waist fan 1 further includes a stand member 92 rotatably connected to the first clamping member 91, allowing the stand member 92 to switch between a retracted state where the stand member 92 is folded relative to the first clamping member 91 and a supporting state where the stand member 92 is positioned at a preset angle relative to the first clamping member 91. In the supporting state, the stand member 92, together with the housing 10, supports the waist fan 1 on an external object. It can be understood that the first clamping member 91 can clamp a first external object to connect the waist fan 1 to the first external object. For example, the first clamping member 91 can be clamped onto a belt to provide airflow to the user or clamped onto a collar to deliver airflow. Moreover, the stand member 92 can be rotated to a preset angle relative to the first clamping member 91 to enter the supporting state, as shown in FIG. 9, allowing the fan to be placed on a flat surface like a table for support. When not in use, the stand member 92 can be rotated back to the retracted state relative to the first clamping member 91 for easy storage or clamping. The configuration of the first clamping member 91 and the stand member 92 enables the waist fan 1 to be clamped onto a first external object or supported on an external object, expanding its usage scope and enhancing product competitiveness.

Furthermore, both the first clamping member 91 and the stand member 92 are made of metal materials. The waist fan 1 further includes a second clamping member 93 connected to the side of the housing 10 opposite to the first clamping member 91. The second clamping member 93 is configured to form a second clamping space together with the housing 10 for clamping a second external object. A clamping direction of the first clamping space is opposite to that of the second clamping space. The second clamping member 93 and a part of the housing 10 connected to the second clamping member 93 may be integrally formed by a same material; or the second clamping member 93 and a part of the housing 10 connected to the second clamping member 93 can be formed individually and then be connected to each other. It can be understood that the second clamping space formed by the second clamping member 93 and the housing 10 has an opposite clamping direction to the first clamping space of the first clamping member 91, which allows the waist fan to be clamped onto a second external object in a direction different from the first external object while still directing the air outlet 13 towards the user. This further expands the usage scope of the waist fan 1 and enhances the user experience. By arranging the second clamping member 93, the waist fan 1 can be clamped onto the second external object and deliver airflow in a direction opposite to that of the first clamping member 91, thus further expanding the waist fan's usage scope. It provides users with more flexible and convenient usage options. Furthermore, the second clamping member 93 and the part of the housing 10 connected to the second clamping member 93 being integrally formed by the same material; or the second clamping member 93 and a part of the housing 10 connected to the second clamping member 93 being formed individually and then being connected to each other, keeps the overall structure of the waist fan 1 simple and compact.

Furthermore, the waist fan 1 further includes a flexible protective sleeve 94 that sleeves on an outer surface 86 of the housing 10. The outer surface 86 includes a main surface 861 and a recessed surface 862 connected to the main surface 861 and recessed inward from the main surface 861. The flexible protective sleeve 94 is positioned in a groove 863 on the recessed surface 862, with an outer surface thereof aligning with the main surface 861. Additionally, an insertion hole 864 is formed on the recessed surface 862, and a protrusion [941] 914 is formed on an inner side of the flexible protective sleeve 94 and extends into the insertion hole 864. The arranging of the flexible protective sleeve 94 effectively not only protects the waist fan 1 from damage in case of accidental drops but also provides anti-slip properties, which is easier for users to grip the waist fan.

Additionally, the housing 10 includes a first housing part 154 and a second housing part 155. The first housing part 154 and the second housing part 155 are positioned opposite to each other and enclose the accommodating cavity 11. The first housing part 154 and the second housing part 155 are fixedly connected together via snaps 891 and/or screws (not shown). When they are connected by screws, screw holes 893 are located on the recessed surface 862 and are concealed by the flexible protective sleeve 94. In the embodiment, the screw holes 893 can be integrated with some of the insertion holes 864. That is, after the first housing part 154 and the second housing part 155 are fixed together by screws, the protrusions 914 of the flexible protective sleeve 94 may extend into the insertion holes 864, which can secure the flexible protective sleeve 94 in place while concealing the screw holes 893. The arranging of the first housing part 154 and the second housing part 155, and connecting the first housing part 154 and the second housing part 155 via snaps 891 and/or screws, facilitates the disassembly and assembly of the waist fan 1 during production, maintenance, and other processes. Additionally, the screw holes 893 is covered by the flexible protective sleeve 94, which not only provides an aesthetic appearance of the waist fan 1 but also protects the screws.

Furthermore, the port assembly 50 of the waist fan 1 includes a first port 51 and a second port 52. The first port 51 is configured to connect to a first external device to supply power to the waist fan 1 and/or to charge the waist fan 1, while the second port 52 is configured to connect to a second external device to supply power to the second external device and/or to charge the second external device. The arranging of the first port 51 and the second port 52 enables the waist fan 1 to supply power and/or charge both the first and second external devices, thereby increasing the waist fan's functionality, expanding the waist fan's usage scope, and enhancing the waist fan's competitiveness.

Additionally, referring to FIGS. 10-15, the control assembly 40 includes a charge and discharge management circuit 71. The charge and discharge management circuit 71 includes a power input terminal, a battery (e.g., BAT) charging terminal, and a discharging terminal. The power input terminal is connected to the first port 51 (e.g., USB1) to receive an external voltage, and the discharging terminal is connected to the second port 52 to supply power to and/or charge the second external device through the second port 52 (e.g., USB2). The battery charging terminal is connected to a battery 62 of the waist fan 1. The control assembly 40 further includes an overvoltage protection circuit 72. The overvoltage protection circuit 72 includes a feedback terminal connected to the first port 51 and an input terminal connected to the battery 62 to obtain an operating voltage. The light-emitting assembly 30 includes a plurality of first light-emitting elements 31 connected in series to form a series circuit. Each first light-emitting element 31 includes a power pin, an input pin, an output pin, and a ground pin. The power pins of the first light-emitting elements 31 are used to receive a power supply voltage. The plurality of first light-emitting element 31 includes a front light-emitting element located at one end of the series circuit, a rear light-emitting element located at another end of the series circuit, and middle light-emitting elements located between the front light-emitting element and the rear light-emitting element; the input pin of the front light-emitting element is configured to receive the power supply voltage; the output pin of the front light-emitting element or the output pin of each middle light-emitting elements is connected to the input pin of a next adjacent first light-emitting element, and the output pin of the rear first light-emitting element is left floating.

Furthermore, the control assembly 40 further includes a fan control circuit 73, a boost circuit 74, and a main control circuit 75. The battery 62 is electrically connected to the fan assembly 20 through the boost circuit 74. The fan control circuit 73 includes a first switch 731. The first switch includes a first conduction terminal connected to the boost circuit 74, a second conduction terminal grounded, and a control terminal connected to the main control circuit 75.

The main control circuit 75 is configured to output a PWM control signal to the control terminal of the first switch 731. The control assembly 40 further includes an indicator light circuit 76 connected between the battery 62 and ground. The indicator light circuit 76 includes an indicator light D4 and a second switch Q6 connected in series with the indicator light D4. The second switch Q6 includes a control terminal of the second switch Q6 connected to the main control circuit 75. The control assembly 40 further includes a battery protection circuit 77. The battery protection circuit 77 includes a third switch Q8 and a fourth switch Q9. The third switch Q8 includes two conduction terminals of the third switch Q8 respectively connected between the battery 62 and the first port 51 and a control terminal of the third switch Q8 grounded via the fourth switch Q9, and the control terminal of the fourth switch Q9 is connected to the main control circuit 75.

The above-described embodiments merely illustrate several embodiments of the present disclosure, and the description thereof is relatively specific and detailed, but it should not be construed as limiting the scope of patent protection. It should be pointed out that, for ordinary skilled in the art, several modifications and improvements can be made without departing from the concept of the present disclosure, which all fall within the scope of protection of the present disclosure. Therefore, the protection scope of the present disclosure should be determined by appended claims.

What is claimed is:

1. A waist fan, comprising
   a housing, comprising an accommodating cavity, an air inlet communicated with the accommodating cavity, and an air outlet communicated with the accommodating cavity;
   a fan assembly, arranged in the accommodating cavity and configured to guide airflow from the air inlet to the air outlet;
   a light-emitting assembly; and
   a control assembly, electrically connected to the light-emitting assembly and configured to control the light-emitting assembly to emit flashing light in different colors and/or warning flashing light;
   wherein the light-emitting assembly comprises at least one first light-emitting element arranged in the accommodating cavity, and the housing comprises a light-transmitting region corresponding to the at least one first light-emitting element and configured to allow light emitted by the at least one first light-emitting element to pass therethrough to an outside of the housing; and
   wherein the housing comprises a main housing with an opening, the light-transmitting region is arranged in the opening and comprises a translucent lamp cover arranged in the opening;
   the lamp cover comprises a cover body portion positioned in the opening and a mounting portion connected to a side of the cover body portion adjacent to the at least one first light-emitting element;
   the light-emitting assembly comprises a light-emitting element circuit board connected to the mounting portion and the at least one first light-emitting element is arranged on a surface of the light-emitting element circuit board adjacent to the lamp cover;
   a stepped portion is formed by the mounting portion and the cover body portion, the main housing is secured to the stepped portion; and
   one of the mounting portion and the light-emitting element circuit board comprises a first fixing portion, another of the mounting portion and the light-emitting element circuit board comprises a second fixing portion, the first fixing portion is securely connected to the second fixing portion to fix the mounting portion to the light-emitting element circuit board.

2. The waist fan according to claim 1, wherein the flashing light in different colors comprises first-color light, second-color light, and/or color-changing flashing light, the first-color light and the second-color light are in different color and are in a single color respectively, and the color-changing flashing light comprises flashing light that constantly switches colors according to a predetermined program or data.

3. The waist fan according to claim 1, wherein each first light-emitting element comprises a light source assembly configured to emit light of multiple colors;
   the light source assembly comprises at least two sub-light sources configured to be controlled individually, each sub-light source is configured to emit light of a color to allow the light source assembly to emit the light of multiple different colors; and
   the number of the first light-emitting element is plurality and each first light-emitting element comprises the light source assembly, and the plurality of first light-emitting element is arranged in a predetermined direction.

4. The waist fan according to claim 1, wherein the light-emitting assembly further comprises a second light-emitting element configured to emit warning flashing light in a first lighting mode and to emit illumination light in a second lighting mode; the warning flashing light is white flashing light and the illumination light is white light; and
   the at least one first light-emitting element is arranged on a first side of the housing, the second light-emitting element is arranged on a second side of the housing different from the first side; and the first side and the second side are opposite to each other.

5. The waist fan according to claim 4, wherein
   the control assembly comprises a first control button arranged on the housing and a main circuit board; the first control button and the light-emitting assembly are electrically connected to the main circuit board, the first control button is configured to be operated to control the light-emitting assembly to emit light; the first control button is configured to generate a first control signal when being applied on a first operation and the main circuit board is configured to control activation, deactivation or a light color of the at least one first light-emitting element according to the first control signal; the first control button is configured to generate a second control signal when being applied on a second operation and the main circuit board is configured to control activation, deactivation or a lighting mode of the second light-emitting element; one of the first operation and the second operation is a short press with a first operation duration, another of the first operation and the second operation is a long press with a second operation duration, and the second operation duration is longer than the first operation duration.

6. The waist fan according to claim 5, wherein the control assembly comprises a second control button arranged on the housing and electrically connected to the main circuit board, the second control button is configured to be operated to control activation, deactivation and a rotational speed of the fan assembly; the first control button comprises a first trigger portion arranged on the main circuit board, the second control button comprises a second trigger portion arranged on the main circuit board, the first control button and the second control button share a same operating keypad, the housing defines a button hole and the operating keypad is mounted in the button hole, a first end of the operating keypad corresponds to the first trigger portion and a second end of the operating keypad corresponds to the second trigger portion, the first trigger portion is configured to generate the first control signal when the first end of the operating keypad is operated, and the second trigger portion is configured to generate the second control signal when the second end of the operating keypad is operated.

7. The waist fan according to claim 1, wherein the housing comprises a main housing and an air outlet member connected to the main housing; the air outlet member comprises a circular inner wall encircling the air outlet, the circular inner wall extends in a direction of the airflow out through the air outlet, the direction of the airflow out through the air outlet is from the air inlet to the air outlet; the air inlet and the air outlet are positioned opposite to each other, and the fan assembly is an axial fan assembly arranged between the air inlet and the air outlet.

8. The waist fan according to claim 7, wherein the air outlet member further comprises a circular top wall connected to the circular inner wall and an outer wall connected to the circular top wall and encircling an outer periphery of the circular inner wall; the outer wall is connected to the main housing; the circular top wall comprises circular patterns, and the outer wall protrudes beyond the circular inner wall in the direction of airflow out through the air outlet member; and an inner diameter of the circular inner wall ranges from 1.5 centimeters to 5 centimeters.

9. The waist fan according to claim 7, wherein the main housing comprises a first lanyard hole configured to be connected to a first lanyard and a second lanyard hole configured to be connected to a second lanyard; both the first lanyard hole and the second lanyard hole are located on a same side of the housing where the air outlet is positioned; and the first lanyard hole and the second lanyard hole are positioned on two opposite sides of the air outlet.

10. The waist fan according to claim 1, further comprising a first clamping member, the housing comprises a clamping member fixing hole, the first clamping member comprises a fixing end, a connecting portion connected to the fixing end, and a clamping portion connected to the connecting portion; the clamping portion is arranged opposite to the fixing end and is configured to form a first clamping space together with the housing to clamp a first external object; and the waist fan further comprises a stand member rotatably connected to the first clamping member; the stand member is configured to be switched between a retracted state where the stand member is folded relative to the first clamping member and a supporting state where the stand member is positioned at a preset angle relative to the first clamping member; and the stand member is configured to support the waist fan on an external object together with the housing in the supporting state.

11. The waist fan according to claim 10, wherein both the first clamping member and the stand member are made of metal materials; the waist fan further comprises a second clamping member connected to a side of the housing opposite to the first clamping member; the second clamping member is configured to form a second clamping space together with the housing to clamp a second external object; a clamping direction of the first clamping space is opposite to that of the second clamping space; and the second clamping member and a part of the housing connected to the second clamping member are integrally formed by a same material; or the second clamping member and a part of the housing connected to the second clamping member are formed individually and then are connected to each other.

12. The waist fan according to claim 1, wherein the waist fan further comprises a port assembly, and the port assembly comprises a first port and a second port; the first port is configured to a first external device to supply power to the waist fan and/or to charge the waist fan; and the second port is configured to connect a second external device to supply power to the second external device and/or to charge the second external device.

13. A waist fan, comprising
a housing, comprising an accommodating cavity, an air inlet communicated with the accommodating cavity, and an air outlet communicated with the accommodating cavity;
a fan assembly, arranged in the accommodating cavity and configured to guide airflow from the air inlet to the air outlet;
wherein the housing comprises a main housing and an air outlet member connected to the main housing;
wherein the fan assembly comprises a fan housing and a blade assembly; the fan housing comprises a cavity and the blade assembly is positioned in the cavity and is mounted on the fan housing;
the fan housing comprises a circumferential sidewall structure and a top wall connected to the sidewall structure; the top wall comprises a plurality of first air-concentrating plates arranged in a ring; a plurality of first air outlet holes are defined among the plurality of first air-concentrating plates;
the fan assembly further comprises an air-concentrating member arranged on the top wall; the air-concentrating member comprises a plurality of second air-concentrating plates arranged in a ring; a plurality of second air outlet holes are defined among the plurality of second air-concentrating plates; and
the fan assembly further comprises a pressurizing member located on a side of the air outlet adjacent to the blade assembly; an inner diameter of the pressurizing member gradually decreases in the direction of airflow out through the air outlet.

14. A waist fan, comprising
a housing, comprising an accommodating cavity, an air inlet communicated with the accommodating cavity, and an air outlet communicated with the accommodating cavity;
a fan assembly, arranged in the accommodating cavity and configured to guide airflow from the air inlet to the air outlet;
wherein the waist fan further comprises a flexible protective sleeve sleeving on an outer surface of the housing;
the outer surface comprises a main surface and a recessed surface connected to the main surface and recessed inward from the main surface; the flexible protective sleeve is positioned in a groove on the recessed surface; and
an insertion hole is formed on the recessed surface, and a protrusion is formed on an inner side of the flexible protective sleeve and extends into the insertion hole.

15. The waist fan according to claim 14, wherein the housing comprises a first housing part and a second housing part; the first housing part and the second housing part are arranged opposite to each other and enclose the accommodating cavity;

the first housing part and the second housing part are fixedly connected together via snaps and/or screws; when the first housing part and the second housing part are fixedly connected via screws, screw holes are located on the recessed surface and are concealed by the flexible protective sleeve.

16. A waist fan, comprising a housing, comprising an accommodating cavity, an air inlet communicated with the accommodating cavity, and an air outlet communicated with the accommodating cavity;

a fan assembly, arranged in the accommodating cavity and configured to guide airflow from the air inlet to the air outlet;

a light-emitting assembly; and a control assembly, electrically connected to the light-emitting assembly and configured to control the light-emitting assembly to emit flashing light in different colors and/or warning flashing light;

wherein the light-emitting assembly comprises a plurality of first light-emitting elements connected in series to form a series circuit; each first light-emitting element includes a power pin, an input pin, an output pin, and a ground pin; the power pins of the first light-emitting elements are configured to receive a power supply voltage, the plurality of first light-emitting elements comprises a front light-emitting element located at one end of the series circuit, a rear light-emitting element located at another end of the series circuit, and middle light-emitting elements located between the front light-emitting element and the rear light-emitting element; the input pin of the front light-emitting element is configured to receive the power supply voltage; the output pin of each of the front light-emitting elements and the middle light-emitting elements is connected to the input pin of a next adjacent first light-emitting element, and the output pin of the rear first light-emitting element is left floating.

17. The waist fan according to claim 16, wherein the waist fan further comprises a port assembly and a battery, and the port assembly comprises a first port and a second port; the first port is configured to a first external device to supply power to the waist fan and/or to charge the waist fan; and the second port is configured to connect a second external device to supply power to the second external device and/or to charge the second external device;

the control assembly further comprises a fan control circuit, a boost circuit, and a main control circuit; the battery is electrically connected to the fan assembly through the boost circuit;

the fan control circuit comprises a first switch; the first switch comprises a first conduction terminal connected to the boost circuit, a second conduction terminal grounded, and a control terminal connected to the main control circuit;

the main control circuit is configured to output a PWM control signal to the control terminal of the first switch;

the control assembly further comprises an indicator light circuit connected between the battery and ground; the indicator light circuit comprises an indicator light and a second switch connected in series with the indicator light; the second switch comprises a control terminal connected to the main control circuit; and the control assembly further comprises a battery protection circuit; the battery protection circuit comprises a third switch and a fourth switch; the third switch comprises two conduction terminals respectively connected between the battery and the first port and a control terminal grounded via the fourth switch, and the control terminal of the fourth switch is connected to the main control circuit.

18. A waist fan, comprising a housing, comprising an accommodating cavity, an air inlet communicated with the accommodating cavity, and an air outlet communicated with the accommodating cavity;

a fan assembly, arranged in the accommodating cavity and configured to guide airflow from the air inlet to the air outlet;

a light-emitting assembly; and a control assembly, electrically connected to the light-emitting assembly and configured to control the light-emitting assembly to emit flashing light in different colors and/or warning flashing light;

wherein the waist fan further comprises a port assembly, and the port assembly comprises a first port and a second port; the first port is configured to a first external device to supply power to the waist fan and/or to charge the waist fan; and the second port is configured to connect a second external device to supply power to the second external device and/or to charge the second external device;

wherein the control assembly comprises a charge and discharge management circuit; the charge and discharge management circuit comprises a power input terminal connected to the first port to receive an external voltage, a battery charging terminal connected to a battery of the waist fan, and a discharging terminal connected to the second port to supply power to and/or charge the second external device through the second port;

the control assembly further comprises an overvoltage protection circuit; the overvoltage protection circuit comprises a feedback terminal connected to the first port and an input terminal connected to the battery to obtain an operating voltage.

* * * * *